United States Patent [19]

Suzuki

[11] Patent Number: 5,748,243
[45] Date of Patent: May 5, 1998

[54] METHOD FOR ENCODING AND DECODING MOTION PICTURE AS A FUNCTION OF ITS NON-LINEAR CHARACTERISTIC

[75] Inventor: Teruhiko Suzuki, Chiba, Japan

[73] Assignee: Sony Corporation, Tokyo, Japan

[21] Appl. No.: 481,395

[22] PCT Filed: Nov. 7, 1994

[86] PCT No.: PCT/JP94/01868

§ 371 Date: Sep. 20, 1995

§ 102(e) Date: Sep. 20, 1995

[87] PCT Pub. No.: WO95/13682

PCT Pub. Date: May 18, 1995

[30] Foreign Application Priority Data

Nov. 8, 1993 [JP] Japan .................................. 5-303565

[51] Int. Cl.[6] .............................. H04N 7/32; H04N 7/30
[52] U.S. Cl. .................................. 348/405; 348/419
[58] Field of Search .................................. 348/405, 406,
348/419, 397, 409, 415, 420, 424, 391,
402, 606, 607, 610, 613, 625, 627; 382/251;
341/138, 200; 375/245; 370/203; H04N 7/32,
7/30

[56] References Cited

U.S. PATENT DOCUMENTS

| 4,559,558 | 12/1985 | Hosoya et al. | 348/625 |
|---|---|---|---|
| 4,875,095 | 10/1989 | Matsumoto et al. | 348/409 |
| 4,953,032 | 8/1990 | Suzaki et al. | 348/607 |
| 4,992,889 | 2/1991 | Yamagami et al. | 348/405 |
| 5,016,104 | 5/1991 | Lim | 348/608 |
| 5,136,377 | 8/1992 | Johnston et al. | 348/415 |
| 5,225,906 | 7/1993 | Sin | 348/608 |
| 5,388,081 | 2/1995 | Hashimoto et al. | 348/607 |
| 5,428,394 | 6/1995 | Yamagami et al. | 348/391 |
| 5,434,623 | 7/1995 | Coleman et al. | 348/405 |
| 5,475,502 | 12/1995 | Lee et al. | 348/384 |
| 5,487,087 | 1/1996 | McCree et al. | 348/405 |
| 5,517,327 | 5/1996 | Nakatani et al. | 348/405 |
| 5,519,456 | 5/1996 | Inamori | 348/405 |
| 5,524,067 | 6/1996 | Miyake et al. | 348/397 |
| 5,542,008 | 7/1996 | Sugahara et al. | 348/405 |

*Primary Examiner*—Howard W. Britton
*Assistant Examiner*—Vu Le
*Attorney, Agent, or Firm*—Frommer Lawrence & Haug LLP; William S. Frommer

[57] ABSTRACT

A method for encoding motion picture, a method for decoding motion picture, a motion picture recording medium, and a motion picture encoding apparatus of the present invention can suppress the decrease in information of the fine pattern of an image while mosquito noise is reduced even in a signal band where an SN ratio is low. When a motion picture signal is encoded by using a specified prediction picture signal, a specified operation is applied to the encoded signal, the signal obtained by the calculation is quantized, and the quantized signal is variable-length encoded, a signal band in which the SN ratio of the picture signal is lowered is quantized and emphasized based on a non-linear characteristic. Then, at the decoding side, a decoded signal is inversely quantized and demodulated based on a non-linear characteristic having a characteristic opposite to the encoding side.

28 Claims, 26 Drawing Sheets

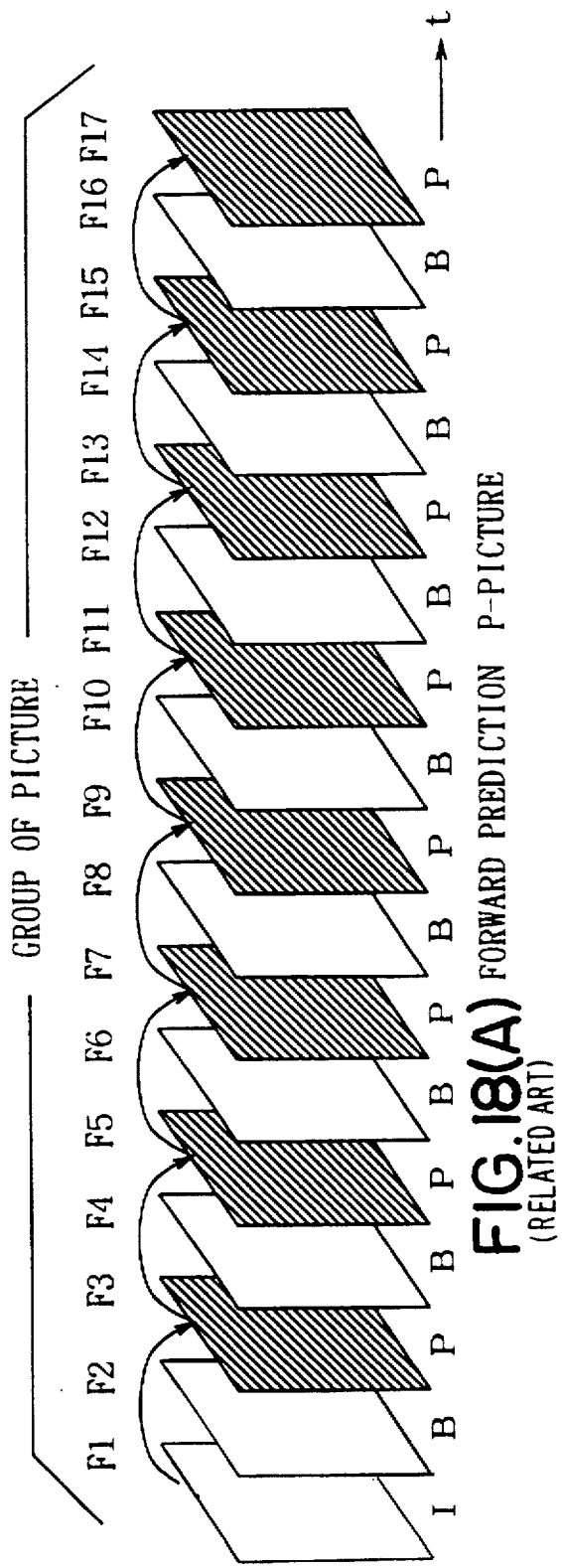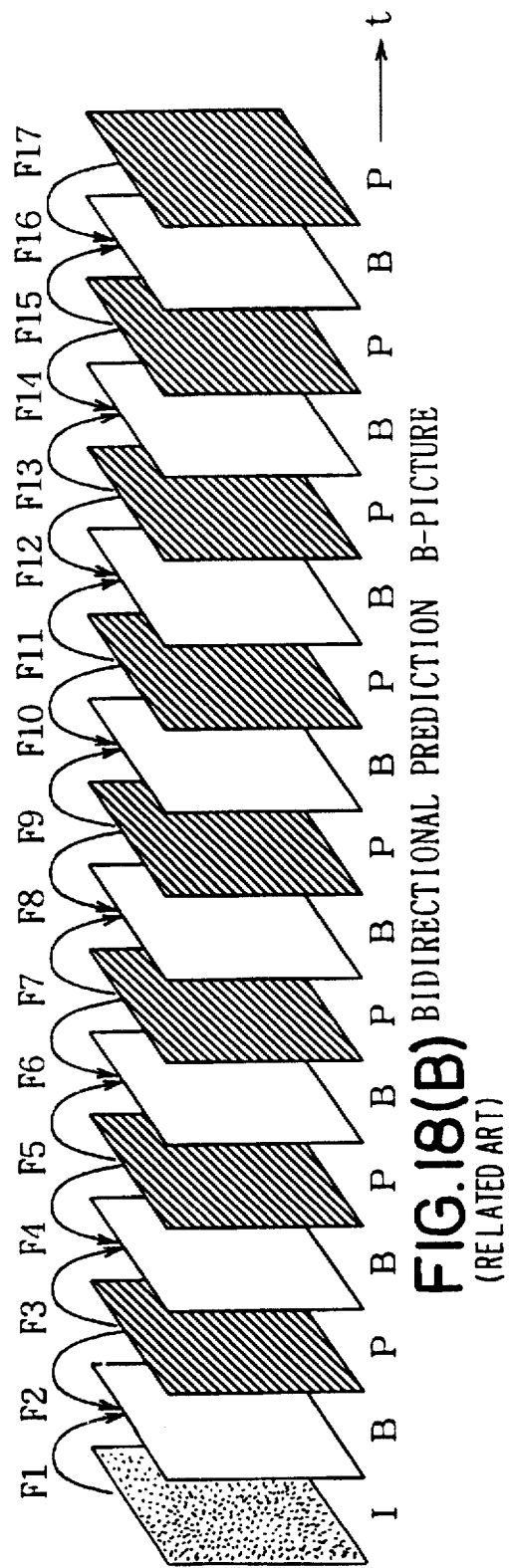
FIG. 18(A) (RELATED ART) FORWARD PREDICTION P-PICTURE
FIG. 18(B) (RELATED ART) BIDIRECTIONAL PREDICTION B-PICTURE

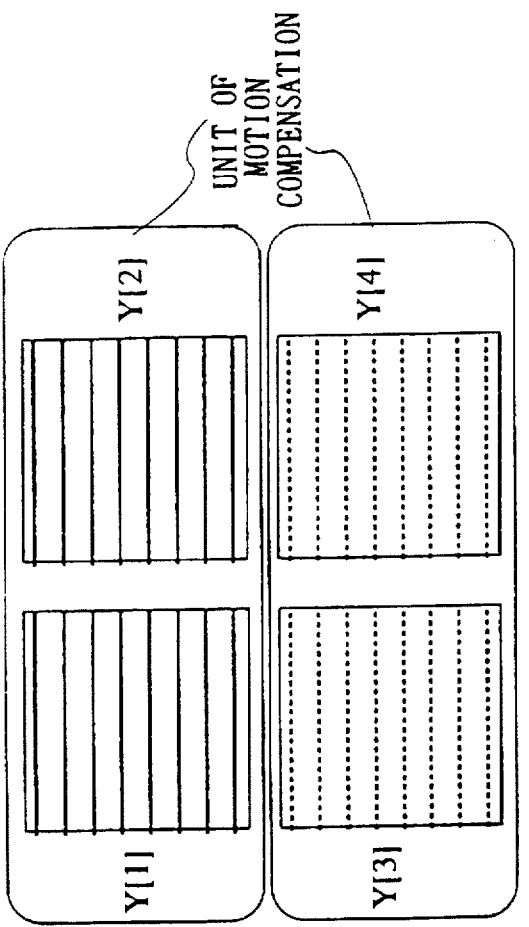
FIG.23(B) (RELATED ART)
FIELD PREDICTION MODE
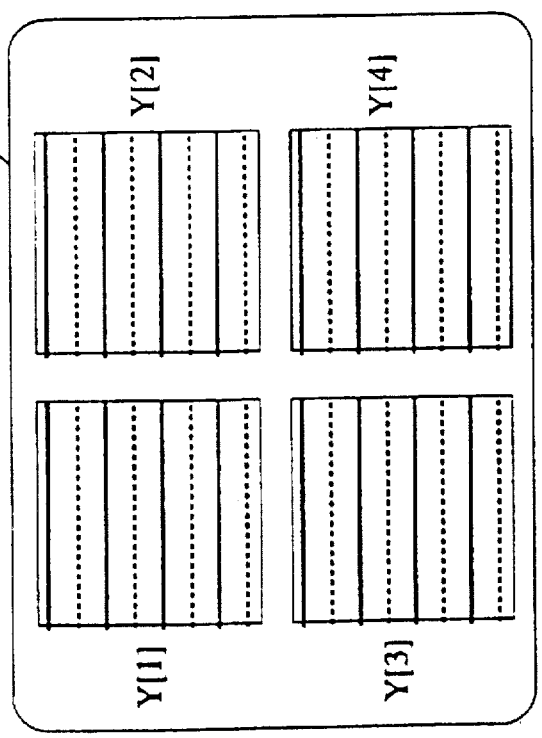
FIG.23(A) (RELATED ART)
FRAME PREDICTION MODE
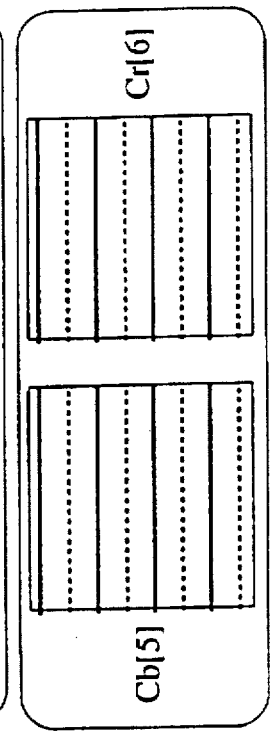
——— DATA OF FIRST FIELD
- - - - DATA OF SECOND FIELD

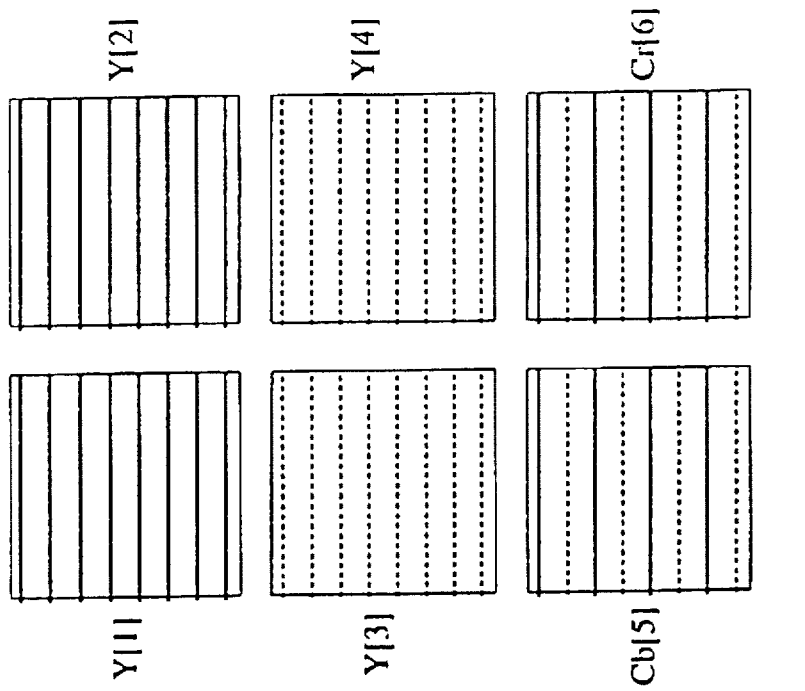
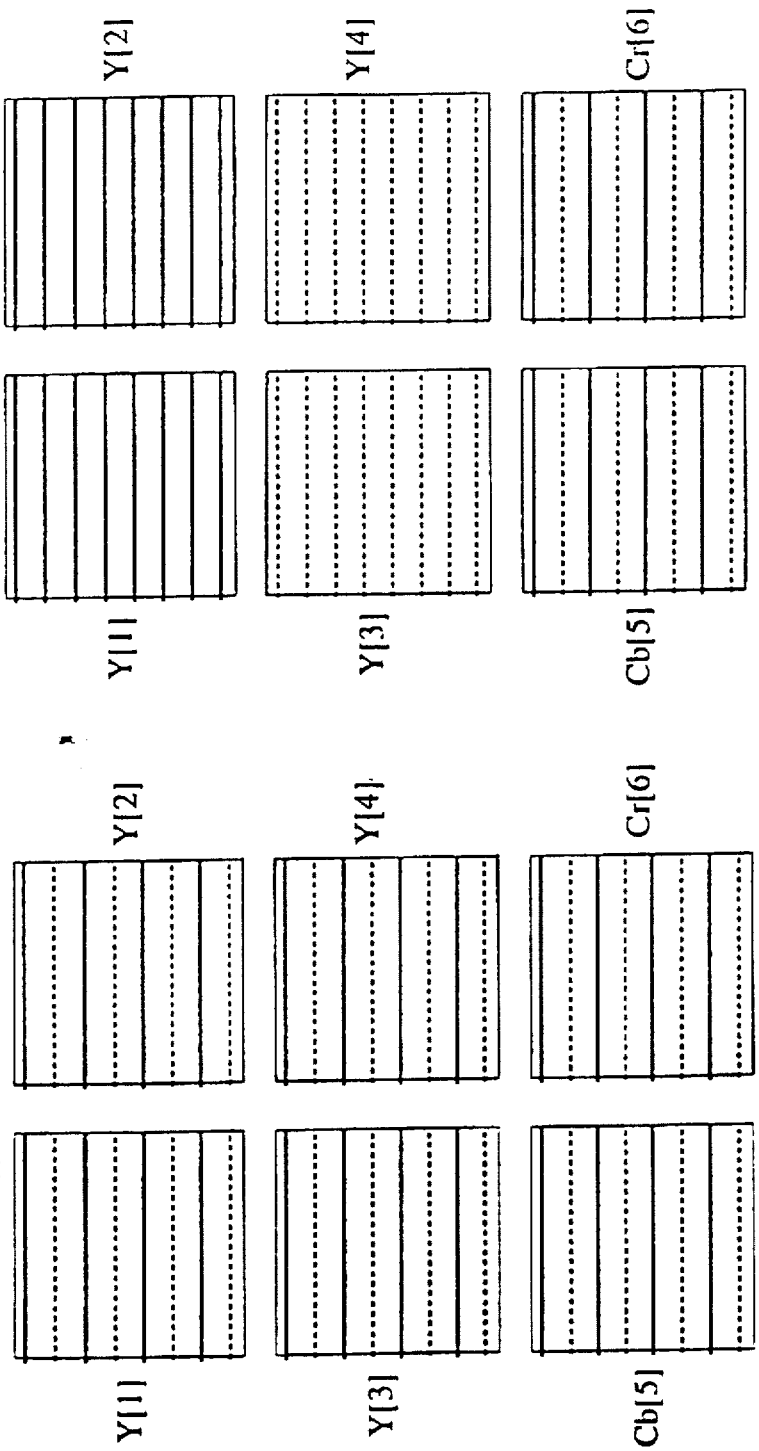

METHOD FOR ENCODING AND DECODING MOTION PICTURE AS A FUNCTION OF ITS NON-LINEAR CHARACTERISTIC

TECHNICAL FIELD

The present invention relates to a method for encoding motion picture, a method for decoding motion picture, a motion picture recording medium, and a motion picture encoding apparatus, and is applicable to, for example, record a motion picture signal on a recording medium such as an optical disk and a magnetic tape to reproduce to display on a display device and so on, and to transmit from a transmitting side to a receiving side via a transmission path to be received and displayed by the receiving side, such as a motion picture signal for a television conference system, a television telephone system, and a broadcasting equipment.

BACKGROUND ART

In the case, for example, of systems for transmitting a motion picture signal to a remote place, such as a television conference system and a television telephone system, the picture signal is compressed and encoded by utilizing the linear correlation or the correlation between frames of the motion picture signal in order to use the transmission path efficiently. In fact, when the linear correlation is utilized, the amount of information can be compressed, for example, by processing the picture signal in accordance with an orthogonal conversion method such as a discrete cosine transform (DCT). Further, when the correlation between frames is utilized, the motion picture signal can be further compressed and encoded.

FIG. 17 shows examples in which the motion picture signals are compressed and encoded using the correlation between frames. In the figure, the three pictures shown in row A indicate frame images PC1, PC2, and PC3 at times t1, t2, and t3, respectively. The difference between the picture signals of the frame images PC1 and PC2 is calculated so that PC12 is generated, and the difference between frame images PC2 and PC3 is calculated so that PC23 is generated. In row B, different pictures are shown and, for convenience, the difference is represented in black.

Generally, pictures of frames temporally adjacent to each other are not substantially different. Therefore, when the difference between the two pictures is calculated, the obtained difference signal is a small value. When this difference signal is encoded, the amount of encoding of the signal can be compressed. For example, in this figure, only the parts shown in black in row B may be encoded. However, when only the difference signals are transmitted, an original picture cannot be restored in the case where the correlation does not exist between the frames as at the change of a scene and the like.

In order to overcome this, it is assumed that the picture of each frame falls into any one of three types of pictures including I-picture (intra-coding), P-picture (forward prediction), and B-picture (bidirectional prediction), and the picture signals are compressed and encoded. Namely, as shown in FIG. 18, the picture signals of 17 frames including frames F1 to F17 are considered as a group of pictures and as one unit for processing. The picture signal of the head frame F1 (the frame shown in black) is encoded by taking it as I-picture. The picture signal of the second frame F2 (the frame shown in white) is processed as B-picture, and the picture signal of the third frame (the frame shown by oblique lines) is processed as P-picture, respectively. After that, the picture signals of the frame F4 to the seventeenth frame F17 are alternately processed as B-picture or P-picture.

As the picture signal of I-picture, a picture signal for one frame is transmitted. On the other hand, for the picture signal of P-picture, as shown in A of FIG. 18, the difference from the picture signal of I-picture or P-picture which is transmitted earlier than the picture signal of P-picture is transmitted basically. Further, as the picture signal of B-picture, as shown in B of FIG. 18, the difference is obtained from the mean value of preceding frame, succeeding frame, or both frames, and then is encoded.

FIG. 19 shows the principle of a method for encoding a motion picture signal in accordance with the manner stated above. In this figure, row A indicates original pictures and row B indicates encoded pictures. The first frame F1 is processed as I-picture, so that the picture signal of I-picture is directly transmitted to a transmission path as a transmission data F1X (coding in a picture). On the other hand, since the second frame F2 is processed as B-picture, the difference between the frame F2 and the preceding frame F1, or the succeeding frame F3, or the average value between the frame F1 and the frame F3 is obtained, and the difference is transmitted as transmission data F2X. Provided that, if further explained in detail, four kinds of processes in macroblock units can be selected in the case of the processing of B-picture.

In the first processing, the data of original frame F2 is transmitted entirely as the transmission data F2X (SP1 (intra-frame coding)), which is similar to the processing of I-picture. In the second processing, the difference between the frame F2 and the succeeding frame F3 is calculated, and then the difference thus obtained is transmitted (SP2 (backward prediction encoding)). In the third processing, the difference between the frame F2 and the preceding frame F1 is transmitted (SP3 (forward prediction encoding)). Further, in the fourth processing, the difference between the frame F2 and the mean value of the preceding frame F1 and the succeeding frame F3 is generated, and then is transmitted as the transmission data F2X (SP4 (bidirectional prediction encoding)).

The picture obtained in accordance with the method for processing by which the smallest amount of transmission data is formed out of these four methods is taken as transmission data of the macro block. When the difference data is transmitted, motion vector x1 (the motion vector between the frame F1 and the frame F2 (in the case of forward prediction)) or motion vector x2 (the motion vector between the frame F3 and the frame F2 (in the case of backward prediction) or both motion vectors x1 and x2 (in the case of bidirectional prediction)) which are between the picture of frame F2 and a picture (prediction picture) of a frame relative to which the difference of the picture of frame F2 is to be calculated are transmitted together with the difference data.

In the case of the frame F3 of P-picture, the preceding frame F1 is taken as a prediction picture, and the difference signal between the frame F1 and the frame F3 and motion vector x3 are calculated, which are transmitted as the transmission data F3X (SP3 (forward prediction encoding)). Otherwise, the data of original frame F3 is directly transmitted as the transmission data F3X (SP1 (intra-frame coding)). When transmission data is transmitted in accordance with any one method of these methods, the method in which the amount of transmission data becomes smaller is more preferably selected in macroblock units, as in the case of B-picture.

FIG. 20 shows an example of the concrete construction of an apparatus for encoding and transmitting a motion picture signal, and for decoding, based on the principle described above. Reference numeral 1 generally designates the construction of an encoding apparatus which encodes input motion picture signal VD and transmits it to a recording medium 3 as a transmission path. Reference numeral 2 generally shows the construction of a decoding apparatus which reproduces a signal recorded on the recording medium 3, and decodes the reproduced signal to output as a video signal.

In the encoding apparatus 1, input video signal VD is input to a preprocessing circuit 11, and is separated into a luminance signal and a color signal (in this case, a color difference signal) those of which are analog-to-digital converted by analog-to-digital (A/D) converters 12 and 13, respectively. The video signals A/D-converted by the A/D converters 12 and 13 into digital signals are supplied and written to a frame memory 14. The luminance signal is written to a luminance signal frame memory 15 and the color difference signal is written to a color difference signal frame memory 16, respectively.

A format conversion circuit 17 converts a signal of a frame format written in the frame memory 14 to a signal of a block format. That is, as shown in FIG. 21, the picture signal written in the frame memory 14 is considered as the data of the frame format in which lines each composed of pixels having H dots per line are collected V lines. The format conversion circuit 17 partitions the signal of the one frame into M slices, each consisting of sixteen lines per unit.

Each slice is divided into M macro blocks. Each of the macro blocks is composed of a luminance signal corresponding to 16×16 pixels (dots). The luminance signal is further partitioned into blocks Y[1] to Y[4] as units each composed of 8×8 dots. A color difference signal consisting of two blocks of Cb signal composed of 8×8 dots and Cr signal composed of 8×8 dots corresponds to the brightness signal composed of 16×16 dots. DCT processing to be described later is performed by 8×8 dots.

In this manner, data BD converted to a block format is supplied from the format conversion circuit 17 to an encoder 18 where converted data BD is encoded. The detailed operation thereof will be explained later with reference to FIG. 22. The signal encoded by the encoder 18 is recorded on the recording medium 3 as a bit stream or output to the transmission path.

Data reproduced from the recording medium 3 is supplied to a decoder 31 of the decoding apparatus 2 to be decoded. The detailed explanation of the decoder 31 will be given hereafter referring to FIG. 25. The data decoded by the decoder 31 is input to a format conversion circuit 32 in which the data is converted from block format to frame format. Then, a brightness signal of the frame format is supplied to be written to a luminance signal frame memory 34 in a frame memory 33, whereas a color difference signal is supplied to be written to a color difference signal frame memory 35. The brightness signal and the color difference signal read from the luminance signal frame memory 34 and the color difference signal frame memory 35 are respectively digital-to-analog converted by digital-to-analog (D/A) converters 36 and 37, and supplied to a postprocessing circuit 38 to be synthesized. Then, the synthesized signal is output and displayed on a display device (not shown) such as a CRT.

Next, with reference to FIG. 22, an example of the construction of the encoder 18 will be described. Image data BD to be encoded is input in respective macroblock units to a motion vector detecting circuit (MV-Det) 50. The motion vector detecting circuit 50 executes the processing of the picture data of each frame as I-picture, P-picture, and B-picture in accordance with a prescribed sequence previously set. It is previously set which one of pictures I, P, or B each of the picture of the respective frames which are sequentially input is to be processed as. For example, as shown in FIG. 18, a group of pictures composed of frames F1 to F17 are processed in accordance with the sequence I, B, P, B, P, ... B, P.

The picture data of a frame to be processed as I-picture (for example, the frame F1) is transferred to a forward original picture part 51a of a frame memory 51 from the motion vector detection circuit 50 and then is stored therein. The picture data of a frame to be processed as B-picture (for example, the frame F2) is transferred to an original picture part 51b and is stored therein. The picture data of a frame to be processed as P-picture (for example, the frame F3) is transferred to a backward original picture part 51c and is stored therein.

At the next timing, when the picture of a frame to be processed as B-picture (the frame F4) or as P-picture (the frame F5) is input, the picture data of first P-picture (the frame F3) which has been stored in the backward original picture part 51c till then is transferred to the forward original picture part 51a. Then, the picture data of next B-picture (the frame F4) is stored (overwritten) in the original picture part 51b, and then the picture data of next P-picture (the frame F5) is stored (overwritten) in the backward original picture part 51c. Such operations are sequentially repeated.

The signals of the respective pictures stored in the frame memory 51 are read therefrom to be executed frame prediction mode processing or field prediction mode processing in a prediction mode switching circuit (Mode-SW) 52. Further, under the control of a prediction determination circuit 54, calculations of prediction in a picture, forward prediction, backward prediction, or bidirectional prediction is performed in a calculator 53. Which processing is to be performed among these processing is determined in macroblock units in accordance with a prediction error signal (difference between a reference picture to be processed and a prediction picture relative thereto). Therefore, the motion vector detecting circuit 50 generates the absolute value sum of prediction error signals (a square sum may be employed) utilized for this determination in macroblock units.

Here, the frame prediction mode and the field prediction mode in the prediction mode switching circuit 52 will be described herein below. In a case where the frame prediction mode is set, the prediction mode switching circuit 52 directly outputs four brightness blocks Y[1] to Y[4] supplied from the motion vector detection circuit 50 to the calculator 53 in a subsequent stage. That is, in this case, as shown in FIG. 23(A), line data of odd-numbered fields and line data of even-numbered fields are mixed in each of the brightness blocks. In this frame prediction mode, a prediction is performed on the four brightness blocks as one unit (macro block) and one motion vector corresponds to the four brightness blocks.

On the other hand, in the field prediction mode, the prediction mode switching circuit 52 makes the signal input from the motion vector detection circuit 50 with the constitution shown in FIG. 23(A) constitute the brightness blocks Y[1] and Y[2] among the four brightness blocks of, for example, only dots of lines of odd-numbered fields, and other two brightness blocks Y[3] and Y[4] of data of lines of even-numbered fields, as shown in FIG. 23(B), and then outputs to the calculator 53. In this case, one motion vector corresponds to the two brightness blocks Y[1] and Y[2], and the other motion vector corresponds to the other two brightness blocks Y[3] and Y[4].

The motion vector detection circuit 50 outputs to the prediction determination circuit 54 an evaluation value of encoding in a picture, the absolute value sum of each prediction error of forward prediction, backward prediction, and bidirectional prediction in the frame prediction mode, and the absolute value sum of each prediction error of forward prediction, backward prediction, and bidirectional prediction in the field prediction mode. The prediction determination circuit 54 compares the evaluation value of encoding in a picture and the absolute value sum of respective prediction errors, and gives instruction of the frame prediction mode or the field prediction mode corresponding to the prediction mode in which the compared value is the smallest to the prediction mode switching circuit 52. The prediction mode switching circuit 52 processes the aforementioned processing to the input signal, and then outputs it to the calculator 53. Generally, in a case where the motion of a motion picture is rapid, the field prediction mode is selected, and in a case where the motion of a motion picture is slow, the frame prediction mode is selected.

In the case of the frame prediction mode, as shown in FIG. 23(A), the color difference signal is supplied to the calculator 53 in the state where the data for lines of odd-numbered fields and the data for lines of even-numbered fields are mixed. Furthermore, in the case of the field prediction mode, as shown in FIG. 23(B), the upper halves (four lines) of respective color difference blocks Cb and Cr are regarded as a color difference signal of odd-numbered fields corresponding to brightness blocks Y[1] and Y[2], and the lower halves (four lines) of respective color difference blocks Cb and Cr are regarded as a color difference signal of even-numbered fields corresponding to brightness blocks Y[3] and Y[4].

In the prediction determination circuit 54, the motion vector detection circuit 50 further generates the absolute value sum of prediction errors in order to determine which is to be carried out for prediction in a picture, forward prediction, backward prediction, or bidirectional prediction, and which is to be carried out for the frame prediction or the field prediction in such a manner as follows. More specifically, as the evaluation value corresponding to the absolute value sum of the prediction errors in the encoding in a picture, the absolute value sum $\Sigma |Aij-(\text{mean value of } Aij)|$, which is the difference between signal Aij of macroblock of the reference picture to be encoded later and its mean value, is obtained. Further, as the absolute value sum of the prediction errors of the forward prediction, $\Sigma |Aij-Bij|$, which is sum of the absolute value $|Aij-Bij|$ of the difference Aij-Bij between macroblock signal Aij of the reference picture and macroblock signal Bij of a prediction picture, is obtained. Furthermore, the absolute value sum of the prediction errors in the case of backward prediction and bidirectional prediction is obtained in the same manner as in the case of forward prediction (prediction pictures are changed into which is different from in the case of forward prediction). Moreover, the absolute value sum of the prediction error is obtained in both the frame prediction mode and the field prediction mode.

These absolute value sums are supplied to the prediction determination circuit 54. The prediction determination circuit 54 selects the smallest value among the absolute value sums of the prediction errors including forward prediction, backward prediction, and bidirection prediction for the frame prediction mode and the field prediction mode, respectively, as the absolute value sum of prediction errors in an interprediction. Further, the prediction determination circuit 54 compares the absolute value sum of the prediction errors in this interprediction with the evaluation value in the encoding in a picture, and then selects the smaller one to select a mode corresponding to the selected value as a prediction mode (P-mode). That is, if the evaluation value of the encoding in a picture is smaller, a mode of encoding in a picture is set. If the absolute value sum of the prediction errors in interprediction is smaller, one of the modes of forward prediction, backward prediction, and bidirectional prediction in which corresponding absolute value sum is the smallest is set.

As described above, the prediction mode switching circuit 52 supplies the macro block signal of the reference picture with a constitution corresponding to either a frame prediction mode or a field prediction mode selected by the prediction determination circuit 54 to the calculator 53. The motion vector detection circuit 50 detects motion vector MV between the prediction picture corresponding to the prediction mode (P-mode) selected by the prediction determination circuit 54 and the reference picture, and then outputs it to a variable-length encoding circuit (VLC) 58 and a motion compensation circuit (M-comp) 64. As the motion vector, one of which the absolute value sums of the corresponding prediction errors is the smallest is selected.

When the motion vector detection circuit 50 reads out the picture data of I-picture from the forward original picture part 51a, the prediction determination circuit 54 sets the mode of encoding in a picture (a mode executing no motion compensation) as a prediction mode, and switches the switch of the calculator 53 to the side of contact "a". Thus, the picture data of I-picture is input to a DCT mode switching circuit (DCT CTL) 55.

As shown in FIGS. 24(A) or 24(B), this DCT mode switching circuit 55 puts the data of four brightness blocks in the state where the lines of odd-numbered fields and the lines of even-numbered fields are mixed (frame DCT mode) or a state where they are separated (field DCT mode) to output to a DCT circuit 56. More specifically, the DCT mode switching circuit 55 compares encoding efficiency in a case where the data of odd-numbered fields and the data of even-numbered fields are mixed and DCT processing is performed with encoding efficiency in a case where they are separated and DCT processing is performed thereon, and then selects the mode having better encoding efficiency.

For example, as shown in FIG. 24(A), an input signal is assumed to have such a constitution in which the lines of odd-numbered fields and even-numbered fields are mixed. Then, the differences between signals of lines of odd-numbered field and signals of lines of even-numbered field each of which are vertically adjacent to each other are respectively calculated to obtain the sum or square sum of the absolute values. Further, as shown in FIG. 24(B), assuming that the input signal have a constitution in which lines of odd-numbered fields and lines of even-numbered fields are separated from each other, the differences between signals of the lines of odd-numbered fields which are respectively vertically adjacent to each other, and the differences between signals of lines of even-numbered fields which are respectively vertically adjacent to each other are respectively calculated. Then, the sum (or square sum) of the respective absolute values is obtained.

Further, both (the sums of the absolute values) are compared and then a DCT mode corresponding to the smaller value is set. Namely, when the former is smaller, the frame DCT mode is set: when the latter is smaller, the field DCT mode is set. Then, the data having a constitution corresponding to the selected DCT mode is output to the DCT circuit 56, and simultaneously a DCT flag (DCT-FLG) indicating the selected DCT mode is output to the variable-length encoding circuit 58 and the motion compensation circuit 64.

The comparison of the prediction mode (FIG. 23) in the prediction mode switching circuit 52 with the DCT mode (FIG. 24) in this DCT mode switching circuit 55 definitely shows that the data constructions in both of the modes are substantially the same concerning the brightness blocks. Generally, when the frame prediction mode is selected in the circuit 52, there switching circuit 52, there is a high possibility that the frame DCT mode is also selected in the DCT mode switching circuit 55.

Further, when the field prediction mode is selected in the prediction mode switching circuit 52, the field DCT mode may be selected most probably in the DCT mode switching circuit 55. However, the aforementioned processing is not always performed. In the prediction mode switching circuit 52, a mode is determined in such a manner that the absolute value sum of the prediction errors is minimized. On the other hand, in the DCT mode switching circuit 55, a mode is determined in such a manner that encoding efficiency is improved.

The picture data of I-picture output from the DCT mode switching circuit 55 is input to the DCT circuit 56 to be processed a DCT (discrete cosine transform) processing, and then is converted to a DCT coefficient. This DCT coefficient is input to a quantization circuit (Q) 57 to be quantized in accordance with a quantization step which corresponds to the data storage quantity (buffer storage quantity (B-full)) of a transmission buffer (Buffer) 59, and then is input to the variable-length encoding circuit 58. The variable-length encoding circuit 58 converts picture data supplied from the quantization circuit 57 (in this case, the data of I-picture) to a variable-length encode such as a Huffman code corresponding to the quantization step (scale (QS)) supplied from the quantization circuit 57, and then outputs it to the transmission buffer 59.

Into the variable-length encoding circuit 58, are input the quantization step (scale (QS)) from the quantization circuit 57, the prediction mode (a mode indicating which is set, a prediction in a picture, forward prediction, backward prediction, or bidirectional prediction (P-mode)) from the prediction determination circuit 54, the motion vector (MV) from the motion vector detection circuit 50, the prediction flag (a flag indicating which is set, either a frame prediction mode or a field prediction mode (P-FLG)) from the prediction mode switching circuit 52, and the DCT flag (a flag indicating which is set, either a frame DCT mode or a field DCT mode (DCT-FLG)) output from the DCT mode switching circuit 55. They are also variable-length encoded.

The transmission buffer 59 temporarily stores the input data and outputs the data corresponding to the storage quantity to the quantization circuit 57. When the residual quantity of the data thereof increases up to an allowable upper limit value, the transmission buffer 59 increases the quantization scale of the quantization circuit 57 by a quantization control signal (B-full), so that the quantity of the quantized data is decreased. In contrast, when the residual quantity of data decreases up to an allowable minimum value, the transmission buffer 59 decreases the quantization scale of the quantization circuit 57 by the quantization control signal (B-full), so that the quantity of quantized data is increased. In such a manner, the overflow or underflow of the transmission buffer 59 can be prevented. The data stored in the transmission buffer 59 is read out at a prescribed timing, and is output to the transmission path or recorded on the recording medium 3.

On the other hand, the data for I-picture output from the quantization circuit 57 is input to an inverse quantization circuit (IQ) 60 to be inversely quantized based on a quantization step supplied from the quantization circuit (QS) 57. The output from the inverse quantization circuit 60 is input to an inverse DCT (IDCT) circuit 61 to be performed inverse DCT processing, and then blocks are rearranged in accordance with respective DCT modes (frame/field) by a block rearrangement circuit (Block Change) 65. The output signal from the block rearrangement circuit 65 is supplied via a calculator 62 to a forward prediction picture area (F-P) 63a of a frame memory 63, and then stored therein.

In a case where the picture data of respective frames which are sequentially input is processed as, for example, pictures of I, B, P, B, P, B . . . , the motion vector detection circuit 50 processes the picture data of a frame input first as I-picture. Then, before processing the picture of the frame input next as B-picture, the motion vector detection circuit 50 processes the picture data of a frame input further next as P-picture. Since B-picture is attended with backward prediction, B-picture cannot be decoded if P-picture as a backward prediction picture is not prepared beforehand.

Thus, the motion vector detection circuit 50 starts processing for picture data of P-picture stored in the backward original picture part 51c subsequent to the processing of I-picture. Then, similarly to the case described above, the absolute value sum of the differences (prediction errors) between frames or fields in macroblock units is supplied from the motion vector detection circuit 50 to the prediction determination circuit 54. The prediction determination circuit 54 sets the prediction mode of frame/field prediction mode and encoding in a picture, or forward prediction, corresponding to the absolute value sum of the prediction errors of the macro block of P-picture.

When the interframe encoding mode is set, the calculator 53 switches the switch to the side of contact "a", as described above. Therefore, the data at this time is transmitted to the transmission path via the DCT mode switching circuit 55, the DCT circuit 56, the quantization circuit 57, the variable-length encoding circuit 58, and the transmission buffer 59, as similar to the data for I-picture. This data is also supplied to a backward prediction picture area (B-P) 63b of the frame memory 63 via the inverse quantization circuit 60, the inverse DCT circuit 61, the block rearrangement circuit 65, and the calculator 62 and stored therein.

At the time of the forward prediction mode, the switch is switched to contact "b", and the picture (in this case, the picture of I-picture) data stored in the forward prediction picture area 63a of the frame memory 63 is read out, and the motion compensation is performed by the motion compensation circuit 64 corresponding to a motion vector output by the motion vector detection circuit 50. That is, when the setting of the forward prediction mode is commanded by the prediction determination circuit 54, the motion compensation circuit 64 shifts the read-out address of the forward prediction picture area 63a from the position corresponding to the macroblock currently output by the motion vector detection circuit 50 by an amount corresponding to the motion vector to read out the data, and generates the prediction picture data.

The prediction picture data output from the motion compensation circuit 64 is supplied to a calculator 53a. The calculator 53a subtracts the prediction picture data corresponding to the macroblock of the reference picture which is supplied from the motion compensation circuit 64 from the data of the macroblock of the reference picture supplied from the prediction mode switching circuit 52, and outputs the difference (prediction error). The difference data is transmitted to the transmission path via the DCT mode switching circuit 55, the DCT circuit 56, the quantization circuit 57, the variable-length encoding circuit 58, and the transmission buffer 59. Further, this difference data is also locally decoded by the inverse quantization circuit 60 and the inverse DCT circuit 61, and input to the calculator 62 via the block rearrangement circuit 65.

Also to this calculator 62, the data same as the prediction picture data supplied to the calculator 53a is supplied. The calculator 62 adds the prediction picture data output by the motion compensation circuit 64 to the difference data output from the inverse DCT circuit 61. Thus, the picture data for original (decoded) P-picture is obtained. The picture data for P-picture is supplied to the backward prediction picture area 63b of the frame memory 63 and stored therein.

After the data for I-picture and the data for P-picture are respectively stored in the forward prediction picture area 63a and in the backward prediction picture area 63b, the motion vector detection circuit 50 executes the processing of B-picture. The prediction determination circuit 54 sets the frame/field mode in accordance with the magnitude of the absolute value sum of the difference (prediction error) between frames or fields in macroblock units, and sets the prediction mode to the interframe prediction mode, forward prediction mode, backward prediction mode, or bidirectional prediction mode. As described above, at the time of the interframe prediction mode or the forward prediction mode, the switch is switched to contact "a" or contact "b". At this time, processing similar to that in the case of P-picture is carried out to transmit the data.

On the other hand, when the backward prediction mode or the bidirectional prediction mode is set, the switch is switched to contact "c" or contact "d". Upon the backward prediction mode in which the switch is switched to contact "c", the picture data stored in the backward prediction picture area 63b (in this case, the picture of P-picture) is read out, and motion compensation is performed by the motion compensation circuit 64 in accordance with the motion vector output from the motion vector detection circuit 50. That is, when the setting of the backward prediction mode is commanded from the prediction determination circuit 54, the motion compensation circuit 64 shifts the read-out address of the backward prediction picture area 63b by an amount corresponding to the motion vector from a position corresponding to the position of the macroblock which is currently output by the motion vector detection circuit 50 to read out the data, and generates the prediction picture data.

The prediction picture data output by the motion compensation circuit 64 is supplied to a calculator 53b. The calculator 53b subtracts the prediction picture data supplied from the motion compensation circuit 64 from the data of the macroblock of the reference picture supplied from the prediction mode switching circuit 52, and outputs the difference thereof. This difference data is transmitted to the transmission path via the DCT mode switching circuit 55, the DCT circuit 56, the quantization circuit 57, the variable-length encoding circuit 58, and the transmission buffer 59.

At the time of the bidirectional prediction mode in which the switch is switched to contact "d", the picture data (in this case the picture data of I-picture) stored in the forward prediction picture area 63a and the picture data (in this case, the picture data of P-picture) stored in the backward prediction picture area 63b are read out, and the motion compensation is performed based on the motion vector output by the motion vector detection circuit 50 by the motion compensation circuit 64.

That is, when the setting of the bidirectional prediction mode is commanded from the prediction determination circuit 54, the motion compensation circuit 64 shifts the read-out addresses of the forward prediction picture area 63a and the backward prediction picture area 63b by amounts corresponding to motion vectors (in this case, two motion vectors including one for the forward prediction picture and one for the backward prediction picture from positions corresponding to the positions of the macroblocks currently output by the motion vector detection circuit 50 to read out the data, and thus generates the prediction picture data.

The prediction picture data output from the motion compensation circuit 64 is supplied to a calculator 53c. The calculator 53c subtracts the mean value of the prediction data supplied from the motion compensation circuit 64 from the data of the macroblock of the reference picture supplied from the motion vector detection circuit 50, and then outputs the difference thereof. This difference data is transmitted to the transmission path via the DCT mode switching circuit 55, the DCT circuit 56, the quantization circuit 57, the variable-length encoding circuit 58, and the transmission buffer 59.

The picture of B-picture is not taken as a prediction picture of another picture, thus is not stored in the frame memory 63. In the frame memory 63, a bank switching is executed on the forward prediction picture area 63a and the backward prediction picture area 63b as occasion demands. The picture stored in one or the other picture prediction areas relative to a prescribed reference picture can be switched and output as the forward prediction picture or the backward prediction picture.

The processing described above is mainly given concerning the brightness blocks, and the color difference blocks are similarly processed by using the macroblock shown in FIGS. 23 and 24 as a unit. Incidentally, in the case of processing the color difference blocks, a motion vector having a dimension ½ times in the vertical and horizontal directions as large as that of the motion vector of the corresponding brightness blocks is used.

FIG. 25 is a block diagram showing an example of the construction of the decoder 31 in FIG. 20. The picture data supplied through the transmission path or the recording medium is received by a receiving circuit not shown or reproduced by a reproducing device, and then temporarily stored in a receiving buffer (Buffer) 81. Thereafter, the reproduced picture data is supplied to a variable-length decoding circuit (IVLC) 82 of a decoding circuit 90.

The variable-length decoding circuit (IVLC) 82 variable-length decodes the data supplied from the receiving buffer 81, and supplies a motion vector (MV), a prediction mode (P-mode), and a prediction flag (P-FLG) to a motion compensation circuit (M-comp) 87. Further, a DCT flag (DCT-FLG) and a quantization step (QS) are respectively output to an inverse block rearrangement circuit (Block Change) 88 and to an inverse quantization circuit (IQ) 83. The decoded picture data is output to the inverse quantization circuit 83.

The inverse quantization circuit 83 inversely quantizes the picture data supplied from the variable-length decoding circuit 82 in accordance with the quantization step similarly supplied from the variable-length decoding circuit 82 to output to an inverse DCT circuit 84. The data (DCT coefficient) output from the inverse quantization circuit 83 is processed an inverse DCT processing in the inverse DCT circuit 84, and is supplied to a calculator 85.

In a case where the picture data supplied from the inverse DCT circuit 84 is the data of I-picture, that data is output from the calculator 85, supplied to a forward prediction picture area (F-P) 86a of a frame memory 86 in order to generate the prediction picture data of picture data (the data of P or B-picture) to be input to the calculator 85 later, and is stored therein. Further, this data is output to a format conversion circuit 32 (FIG. 20).

In a case where the picture data supplied from the inverse DCT circuit 84 is the data of P-picture which utilizes picture data preceding by one frame to that picture data as a prediction picture data and the data of a forward prediction mode, the picture data (data of I-picture) preceding by one frame to the data of P-picture which is stored in the forward prediction picture area 86a of the frame memory 86 is read out, and motion compensation corresponding to the motion vector output from the variable-length-decoding circuit 82 is performed in the motion compensation circuit 87.

In the calculator 85, the picture data (difference data) supplied from the inverse DCT circuit 84 is added and the picture data thus added is output. This added data, that is, the decoded data of P-picture is supplied to and stored in a backward prediction picture area (B-P) 86b of the frame memory 86 in order to generate the prediction picture data of picture data (data of B or P-picture) which is subsequently input to the calculator 85.

Although being the data of P-picture, the data of a prediction mode in a picture is not processed any processing in the calculator 85 as in the case of the data of I-picture, and is stored in the backward prediction picture area 86b as is. Since being a picture to be displayed next to subsequent B-picture, P-picture is not yet output to the format conversion circuit 32 at this time. In short, as described above, P-picture input after B-picture is processed and transmitted previous to B-picture.

In a case where the picture data supplied from the inverse DCT circuit 84 is the data of B-picture, the picture data (in the case of the forward prediction mode) of I-picture stored in the forward prediction picture area 86a of the frame memory 86, the picture data (in the case of the backward prediction mode) of P-picture stored in the backward prediction picture area 86b, or both the picture data (in the case of the bidirectional prediction mode) is read out corresponding to the prediction mode supplied from the variable-length decoding circuit 82. And then, in the motion compensation circuit 87, the motion compensation corresponding to the motion vector output from the variable-length decoding circuit 82 is performed thereon, so that a prediction picture is generated. In a case where motion compensation is not needed, that is, in the case of the prediction mode in a picture, the prediction picture is not generated.

The data in which the motion compensation is performed at the motion compensation circuit 87 in this manner is added to the output of the inverse DCT circuit 84 in the calculator 85. This added output is output to the format conversion circuit 32. In this case, the added output is the data of B-picture and is not used for generating the prediction picture of any other picture, and thus is not stored in the frame memory 86. After the picture of B-picture is output, the picture data for P-picture stored in the backward prediction picture area 86b is read out and supplied via the motion compensation circuit 87 to the calculator 85. In this case, motion compensation is not carried out.

In the processing described above, the processing of the brightness signal is described. The processing of the color difference signal is also performed similarly thereto. In this case, a motion vector which has a dimension ½ times in the horizontal and vertical directions as large as that of the motion vector for the brightness signal is utilized.

The conversional encoding in the picture encoding described above can compress the quantity of information by utilizing the correlation of an input signal and concentrating a signal electric power on prescribed coordinate axes. A DCT is a an example of conversion system utilized for such conversional encoding processing, particularly orthogonal transformation. In Accordance with the DCT, the two-dimensional correlation characteristic of a picture signal is utilized to make the signal power concentrate on a particular frequency component, and only these concentrated and distributed coefficients are encoded, so that the quantity of information can be compressed. For example, in an area where a picture pattern is flat and the autocorrelation capability of the picture signal is high, the DCT coefficients are concentratively distributed in low-frequency components and other components have small values. Therefore, in this case, only the coefficients concentratively distributed in a low-frequency band are encoded, so that the quantity of information can be compressed.

However, in a case of a picture signal including an outline such as the edge of a picture, the DCT coefficients are widely distributed and generated from low-frequency components to high-frequency components. In order to display the discontinuous points of a signal such as the outline by the DCT coefficients with good accuracy, an extremely large number of coefficients is needed, which leads to deterioration in encoding efficiency. At that time, if the quantization characteristic of the coefficients is roughened or the coefficients of the high-frequency components are cut off for high-pressure compressive encoding as in a conventional case, the deterioration of the picture signal stands out, and for example, a distortion such as fluctuation (a corona effect or a mosquito noise or the like, referred to as "noise" hereinafter) is generated around the outline.

Since picture encoding processing utilizes the motion compensation prediction, the noise as described above is successively propagated to the prediction frames and propagated in the direction of time. As a result, in the reproduced picture, it seems that the noise fluctuates irregularly, and therefore, it provides a visually uncomfortable feeling. A prefilter and a postfilter are used for solving this problem. The encoding efficiency is improved by using, for example, a low-pass filter as the prefilter, and thus the generation of the noise can be suppressed. The low-pass filter is also used as the postfilter so that the generated noise is removed not to stand out. As such postfilters, for example, $\epsilon$ filter and a median filter are used.

However, in this manner, the prefilter or the postfilter utilized for reducing the mosquito noise causes not only reduction of the mosquito noise, but also loss of visually important information of the picture signal. That is, in a signal band where an SN ratio is low, it is difficult to discriminate between the distortion of the picture and the fine pattern of the picture, and there occurs a problem in which the picture becomes blurred picture in which the pattern in the flat part is lost because of the low-pass filter.

Concerning the above points, the present invention provides a method for encoding motion picture, a method for decoding a motion picture, a motion picture recording medium and a motion picture encoding apparatus which can suppress the decrease of the information of the fine pattern of a picture to the minimum while lowering noise even in a signal band where the SN ratio is low.

Disclosure of Invention

A method for encoding picture signal of the present invention generates a first quantization coefficient by quantizing at least a part of signal band of a specified picture signal based on a non-linear characteristic, generates a conversion coefficient by performing a specified conversion processing on the first quantization coefficient by a specified block unit, generates a second quantization coefficient by quantizing the conversion coefficient, and variable-length encodes the second quantization coefficient.

Furthermore, a method for decoding picture signal of the present invention variable-length decodes a received encoded picture signal, performs a first inverse quantization to the variable-length decoded signal, performs a specified inverse conversion processing in specified block units to the signal to which the first inverse quantization is performed, and performs a second inverse quantization based on the non-linear characteristic to the signal to which the specified inverse conversion is performed.

Furthermore, in a picture recording medium of the present invention, a first quantization coefficient is generated by quantizing at least a part of signal band of a specified picture signal based on a non-linear characteristic, a conversion coefficient is generated by performing a specified conversion processing to the first quantization coefficient in specified block units, a second quantization coefficient is generated by quantizing the conversion coefficient, the second quantization coefficient is variable-length encoded, and the variable-length encoded signal is recorded on a recording medium.

Furthermore, a picture signal encoding apparatus of the present invention comprises first quantization means 70 for generating a first quantization coefficient by quantizing at least a part of signal band of a specified picture signal based on a non-linear characteristic, conversion means 56 for generating a conversion coefficient by performing a specified conversion processing on the first quantization coefficient by a specified block unit, second quantization means 57 for generating a second quantization coefficient by quantizing the conversion coefficient, and variable-length encoding means 58 for variable-length encoding the second quantization coefficient.

Furthermore, a picture signal decoding apparatus of the present invention comprises variable-length decoding means 82 for variable-length decoding received encoded picture signal, first inverse quantization means 60 for performing a first inverse quantization on the signal which is variable-length decoded, inverse conversion means 61 for performing a specified inverse conversion processing on the signal which is performed the first inverse quantization by a specified block unit, and second inverse quantization means 71 for performing a second inverse quantization on the signal which is performed the specified inverse conversion based on a non-linear characteristic.

The motion picture signal is encoded by using a specified prediction picture signal, a specified calculation is executed to the encoded signal, the signal obtained by the calculation is quantized, and, when the quantized signal is variable-length encoded, the signal band in which SN ratio of the picture signal is low is quantized and emphasized based on a non-linear characteristic. On the decoding side, a decoded signal is inversely quantized and demodulated based on a non-linear characteristic having a characteristic opposite to the encoding side. Therefore, even in the case where it is difficult to discriminate between distortion of the picture and fine patterns of picture, it can be possible to suppress the deterioration of the patterns on the plane part of the picture signal. As a result, it is possible to suppress fine pattern information of the picture while noise being decreased, and to improve SN ratio and visual impression.

BRIEF DESCRIPTION OF THE DRAWINGS

FIG. 18 is a schematic diagram explaining types of pictures when picture data is compressed.

FIG. 23 is a schematic diagram explaining operation of the prediction mode switching circuit in FIG. 22.

FIG. 24 is a schematic diagram explaining operation of the DCT mode switching circuit in FIG. 22.

BEST MODE FOR CARRYING OUT THE INVENTION (1) Fist embodiment

Figure 1A:
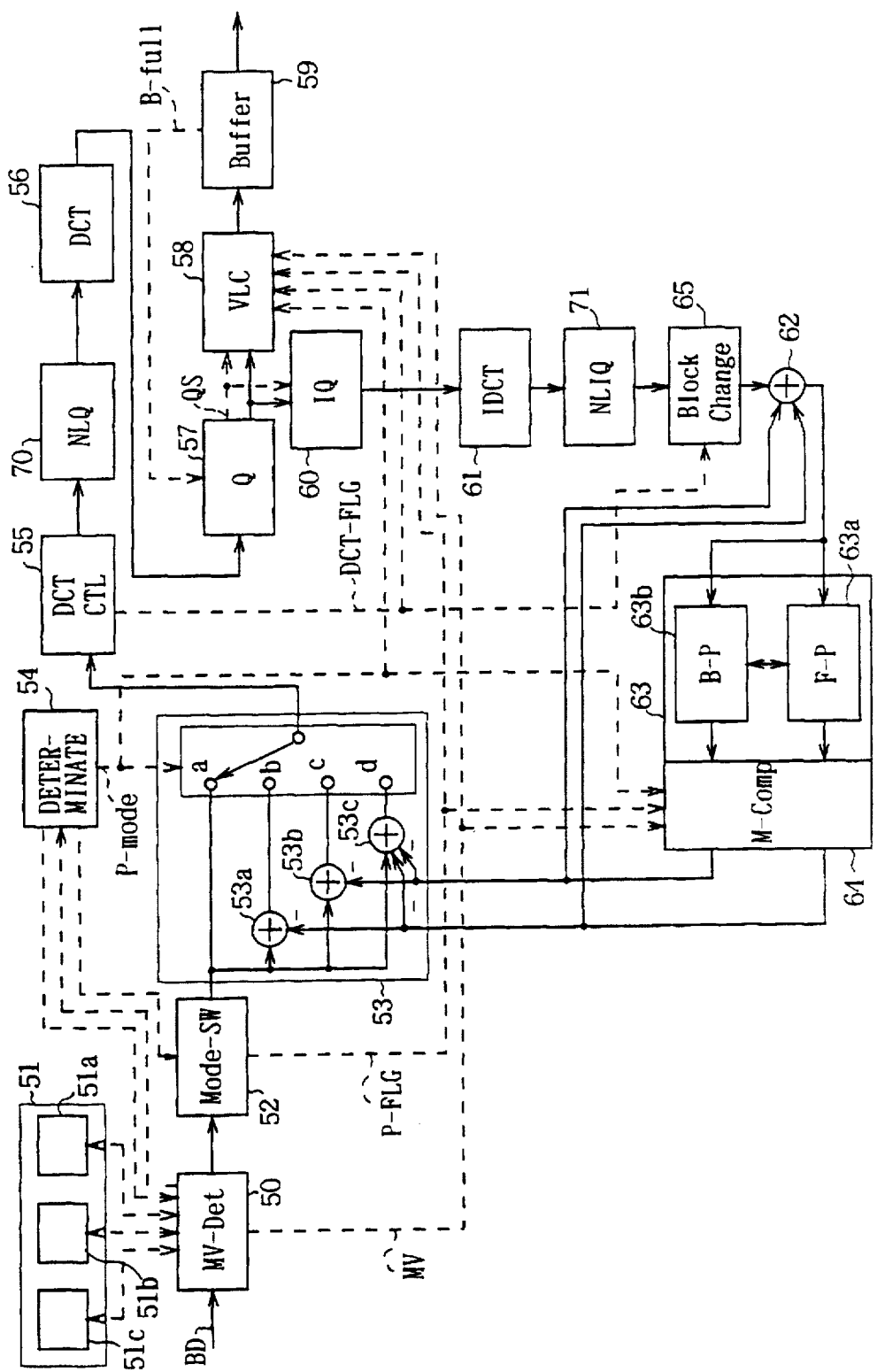
FIG. 1(A) is a block diagram showing a construction of an embodiment of a motion picture encoding apparatus according to the present invention.
Figure 22:
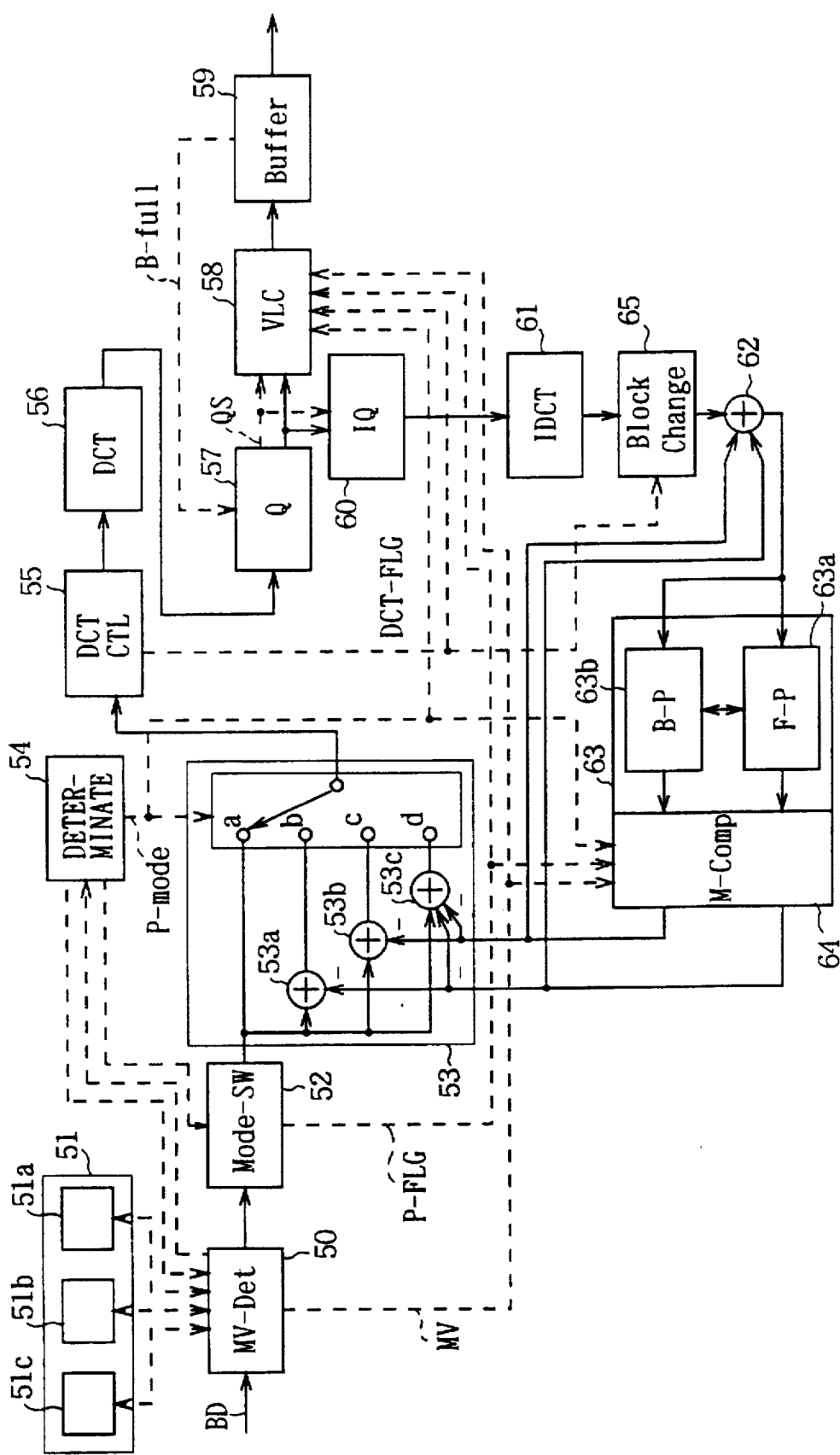
FIG. 22 is a block diagram showing a construction of the encoder in FIG. 20.
Figure 25:
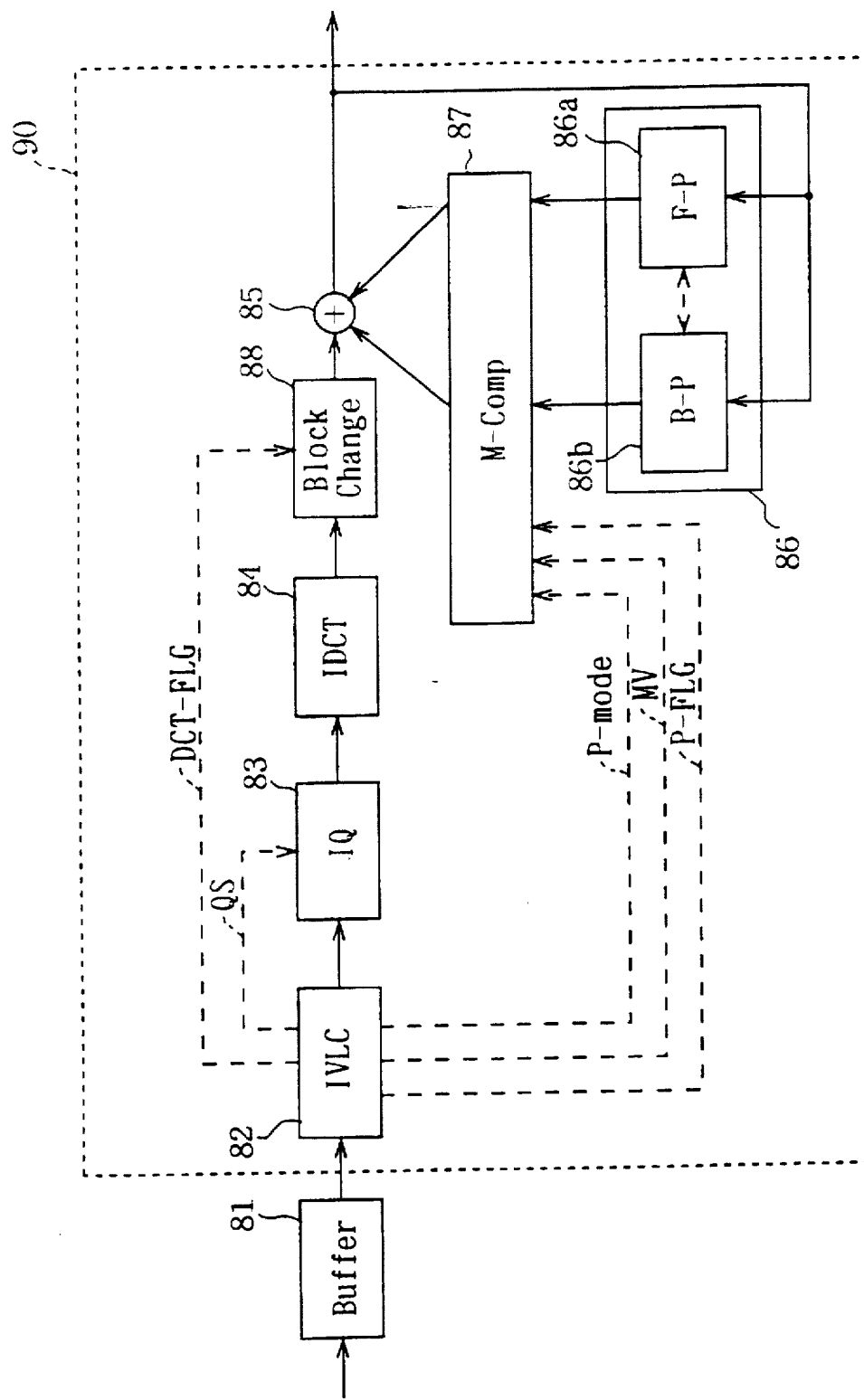
FIG. 25 is a block diagram showing an example of a constitution of the decoder in FIG. 20.

FIG. 1(A) shows a first embodiment of the present invention which has the same arrangement as the aforementioned conventional motion picture encoding apparatus shown in FIG. 22, except for a non-linear quantization circuit (NLQ) 70 and a non-linear inverse quantization circuit (NLIQ) 71. The non-linear quantization circuit 70 will be explained by referring to FIG. 2(A). In the non-linear quantization circuit 70, a pixel value of an original picture in a case of an intra-encoding macroblock, and an interframe or interfield difference value after motion compensation in a case of an interframe or interfield encoding macroblock are respectively supplied to an input terminal 200 in block units, that is, 8×8 pixel unit. A picture signal S201 supplied to the input terminal 200 is input to a low-pass filter (LPF) 201 and an adder 202. The low-pass filter 201 extracts a low-frequency component of the input picture signal S201 by each block unit. The output of the low-pass filter 201 is output to the adders 202 and 204.

The adder 202 calculates the difference between the input picture signal S201 and an output value S202 of the low-pass filter 202 for pixels corresponding to each block, and outputs it (S203). Because the output value S202 of the low-pass filter 201 is the low-frequency component of the picture signal, the output S203 from the adder 202 is a signal representing amplitude of the high-frequency component of the picture signal. The signal S203 is input to a non-linear quantization circuit 203 for high-frequency signal S203.

Figure 3:
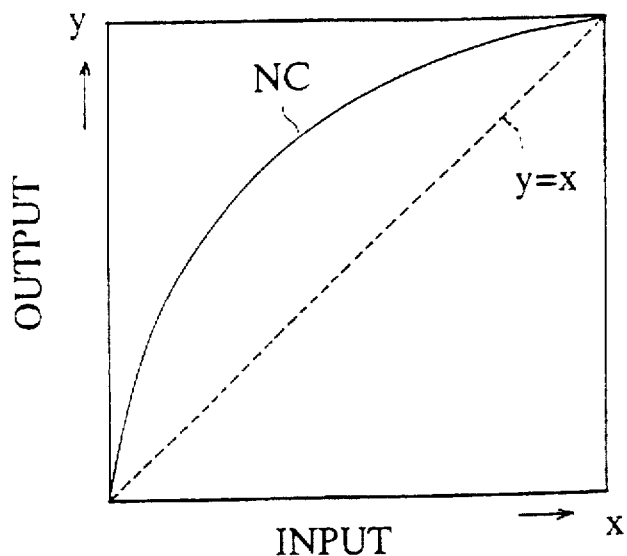
FIG. 3 is a characteristic curvilinear diagram explaining a non-linear quantization characteristic.

The non-linear quantization circuit 203 for high-frequency signal performs non-linear quantization by utilizing the non-liner characteristics shown in FIG. 3. The abscissa in the figure is for values of input picture signal S203 (amplitude values), and the ordinate is for values of output signal S204 (amplitude value). Here, only positive characteristics are shown. The negative ones are symmetrical to the origin. The dot line represented by y=x indicates linear quantization characteristics. In the case where the linear quantization characteristics are used, the input signal S203 and output signal S204 of the non-linear quantization circuit 203 for high-frequency signal become the same signal, so that the input and output signals of the non-linear quantization circuit 70 becomes the same signal. FIG. 3 shows one example regarding non-linear characteristics as NC, but several other non-linear quantization characteristics can be assumed. Therefore, in the case of characteristics in FIG. 3, a value larger than the input signal S203 is output as S204.

The output signal S204 from the non-linear quantization circuit 203 for high-frequency signal is input to the adder 204. The adder 204 adds the signal S204 and the output signal S202 from the low-pass filter 201 for pixels corresponding to each block, and outputs the sum (S205).

S202 is a low-frequency component of the picture signal S201 input to the non-linear quantization circuit 70, while S204 is the high-frequency component of S201 after non-linear quantization. Therefore, an output S205 of the non-linear quantization circuit 70 becomes the signal in which the input signal S201 of the high-frequency component is emphasized. The picture signal the high-frequency range of which is emphasized by the non-linear quantization circuit 70 is input to the DCT circuit 56.

As is the conventional case, the DCT circuit 56 performs DCT conversion for blocks of 8×8 pixels, and inputs a value after conversion to the quantization circuit 57. The value after quantization is input to the variable-length encoding circuit 58. The output of the quantization circuit 57 is also input to the inverse quantization circuit 60. The inverse quantization circuit 60 performs an operation opposite to the quantization circuit 57. The inverse DCT circuit 61 inversely DCT-converts the output value from the inverse quantization circuit 60, and then inputs the restored signal to the non-linear inverse quantization circuit 71.

Figure 4A:
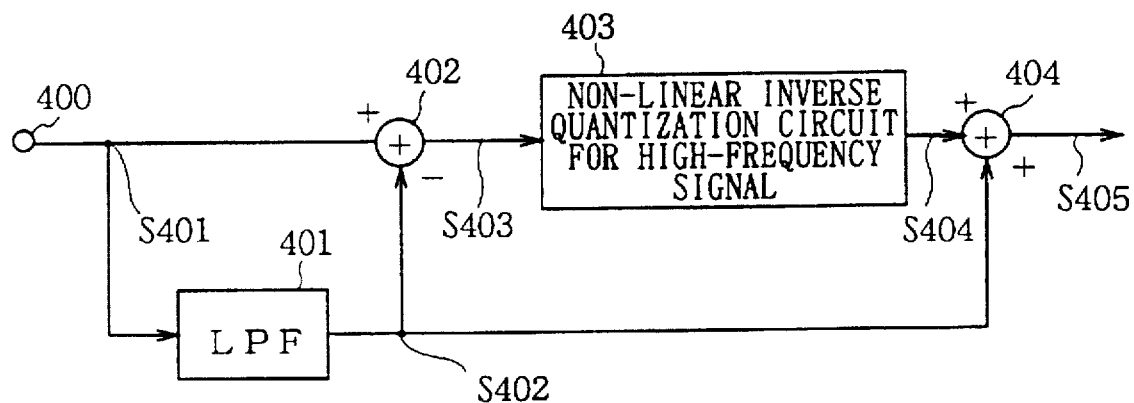
FIGS. 4(A) and 4(B) are block diagrams showing construction of non-linear inverse quantization circuit.

The non-linear inverse quantization circuit 71 is arranged as shown in FIG. 4(A), and performs an operation opposite to the non-linear quantization circuit 70. A block unit signal S401 input through an input terminal 400 of the non-linear inverse quantization circuit 71 is input to a low-pass filter 401 and an adder 402. The low-pass filter 401 extracts the low-frequency component of the signal S401. An output signal S402 of the low-pass filter 401 is input to the adders 402 and 404. The adder 402 obtains the difference between signals S401 and S402 for pixels corresponding to each block, and outputs it (S403). Thus, the signal S402 represents the low-frequency component of the signal S401, while the signal S403 represents the high-frequency component of the signal S401. Signal S403 is input to a non-liner inverse quantization circuit 403 for high-frequency signal.

Figure 5:
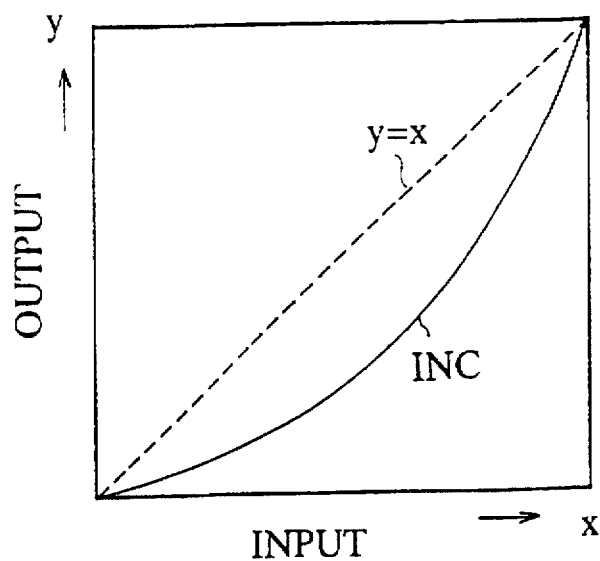
FIG. 5 is a characteristic curvilinear diagram explaining a non-linear quantization characteristic.

The non-linear inverse quantization circuit 403 for high-frequency signal performs non-linear quantization by using non-liner characteristic INC shown in FIG. 5. The non-linear characteristic INC shown in FIG. 5 has characteristics symmetrical to the non-linear characteristic NC shown in FIG. 3. That is, the respective characteristics shown in FIGS. 3 and 5 are symmetrical to the straight line y=x. Here, only positive characteristics are also shown. The negative ones are symmetrical to the origin.

The abscissa in FIG. 5 is for values of the input picture signal S403 (amplitude values), and the axis of ordinates is for values of the output signal S404 (amplitude values). The dot line represented by y=x indicates linear quantization characteristics. When the linear inverse quantization characteristics are used, the input signal S403 and the output signal S404 of the non-linear inverse quantization circuit 403 for high-frequency signal become the same signal, so that the input and output signals of the non-linear inverse quantization circuit 71 become the same signal.

The inverse quantization characteristics to be used in the non-linear inverse quantization circuit 403 for high-frequency signal must be the inverse quantization characteristics which perform an operation opposite to that of the quantization characteristics used in the non-linear quantization circuit 203 for high-frequency signal. The output of the non-linear inverse quantization circuit 403 for high-frequency signal is input to the adder 404. The adder 404 adds signals S404 and S402 for the pixels corresponding to each block to output (S405). In this manner, the non-linear inverse quantization circuit 71 performs an operation to be back the high-frequency components emphasized by the non-linear quantization circuit 70 to the original state.

Figure 6:
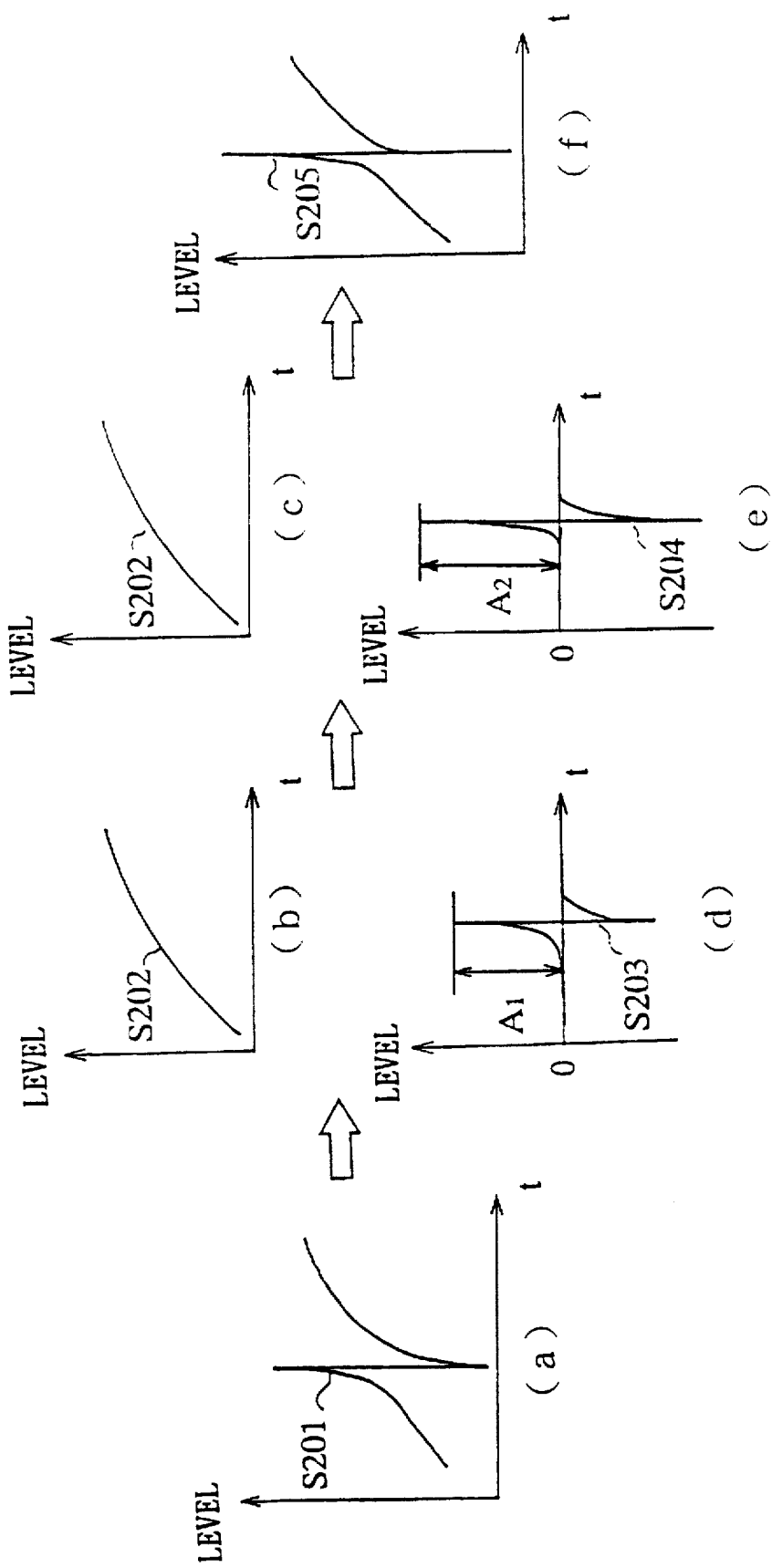
FIG. 6 is a signal waveform diagram explaining the change of a signal in the non-linear quantization circuit.

Explanation is made of the principle in which such non-liner quantization reduces noise such as mosquito noise caused by conversional encoding. FIG. 6 shows changes in signals in the non-linear quantization circuit 70 of FIG. 2(A). (a) shows an example of signal S201. The signal in (a) is extracted its low-frequency component as in (b) by the low-pass filter 201, which is signal S202.

In addition, the adder 202 calculates the difference between S201 and S202, and signal S203 is output as the high-frequency component as shown in (d). In this case, the difference between the maximum value of the signal and the flat area is assumed to be $A_1$. Here, the high-frequency component is emphasized by non-liner quantization. The output S204 of the non-linear quantization circuit 203 for high-frequency signal is shown in (e). In this case, the difference between the maximum value of the signal and the flat area is $A_2$ ($A_2 > A_1$). The adder 204 adds signals S202 and S204, and generates output signal S205 (f).

Figure 7:
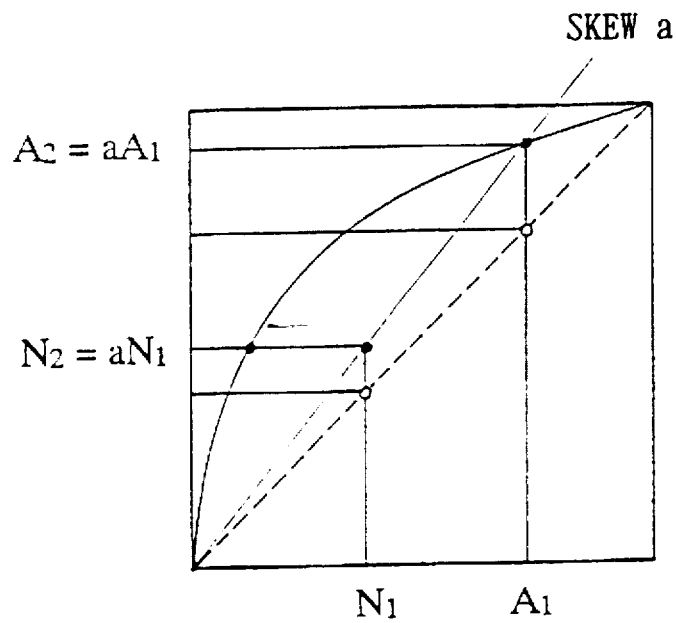
FIG. 7 is a characteristic curvilinear diagram explaining the non-linear quantization characteristic.

The non-linear quantization characteristics is shown in FIG. 7. The abscissa is for values of input signal, while the axis of the coordinate is for values of output signal. Here, only positive characteristics are shown. The negative ones are symmetrical to the origin. Here, it is assumed that the maximum values of distortion and noise components caused in conversion and encoding have values 50% of the maximum values to be input to a conversion circuit (DCT circuit for this embodiment). That is, they are in linear relationship to the maximum values of input to the conversion circuit. A case where the maximum value of input signal is $A_1$ is discussed. It is assumed that the maximum value of distortion caused by the conversional encoding is $N_1$ if no non-linear quantization is performed (FIG. 7). When the non-liner quantization is performed, $A_1$ becomes $A_2 = a \times A_1$. In this case, since the maximum value of distortion is 50% of the signal input to the DCT, it is considered that the maximum value of distortion caused by DCT conversion of the non-linear quantized value becomes $N_2 = a \times N_1$.

Figure 8:
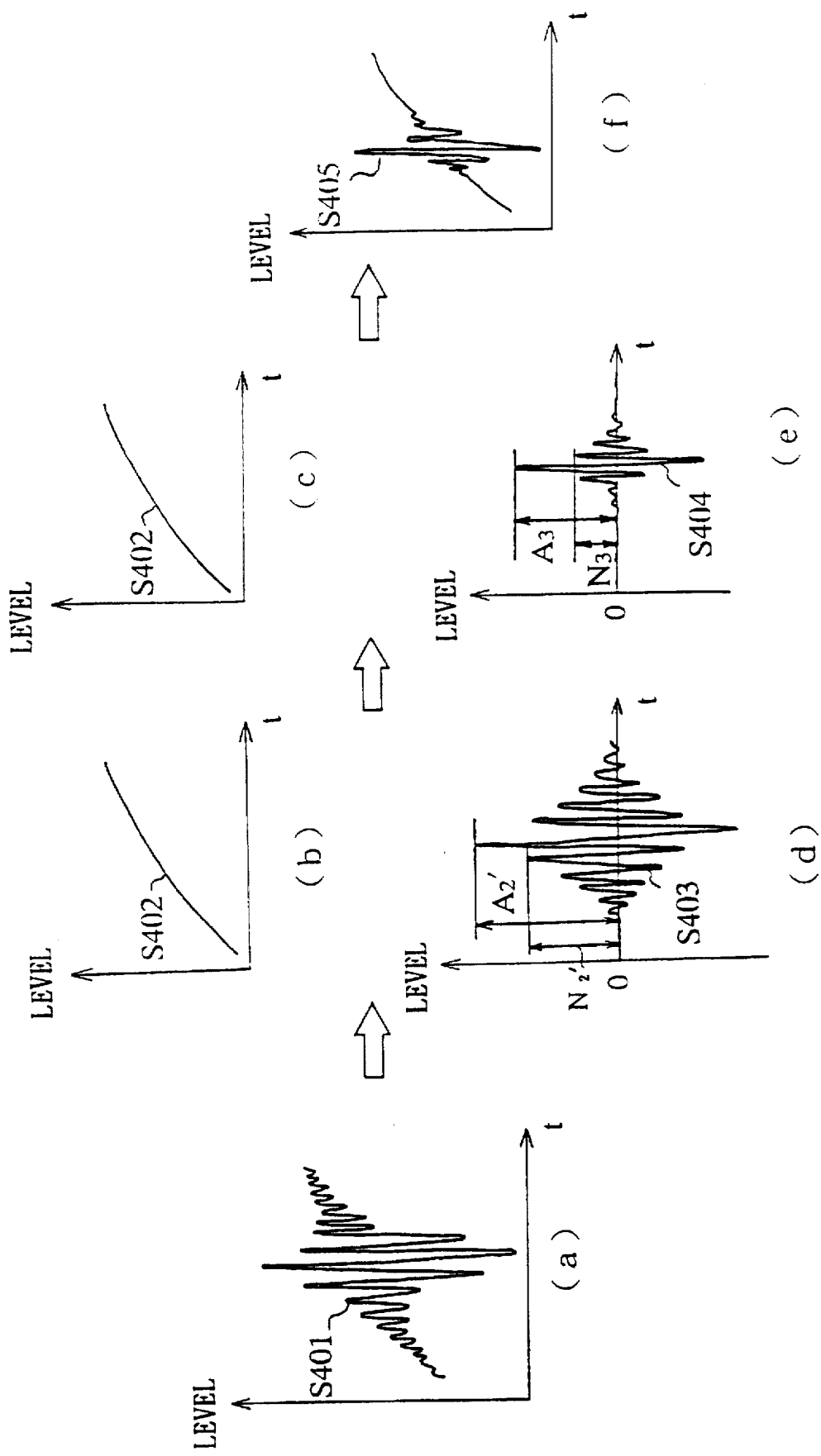
FIG. 8 is a signal waveform diagram explaining the change of a signal in the non-linear inverse quantization circuit.

FIG. 8 shows changes in signals in the non-linear inverse quantization circuit 71 in FIG. 4(A). (a) shows signal S401 in which the signal in (f) of FIG. 6 is processed by the DCT conversion circuit 56, the quantization circuit 57, the inverse quantization circuit 60, and the inverse DCT circuit 61, and then is input to the non-linear inverse quantization circuit 71. The signal S401 is extracted its low-frequency component S402 by the low-pass filter 401. The signal S402 is shown in (b).

The adder 402 calculates the difference between signals S401 and S402 in order to extract the high-frequency component S403. S403 is shown in (d). The signal shown in (d) is added distortion caused by conversional encoding. At this time, it is assumed that the maximum value of signal is $A_2'$, and the maximum value of distortion is $N_2'$.

Figure 9:
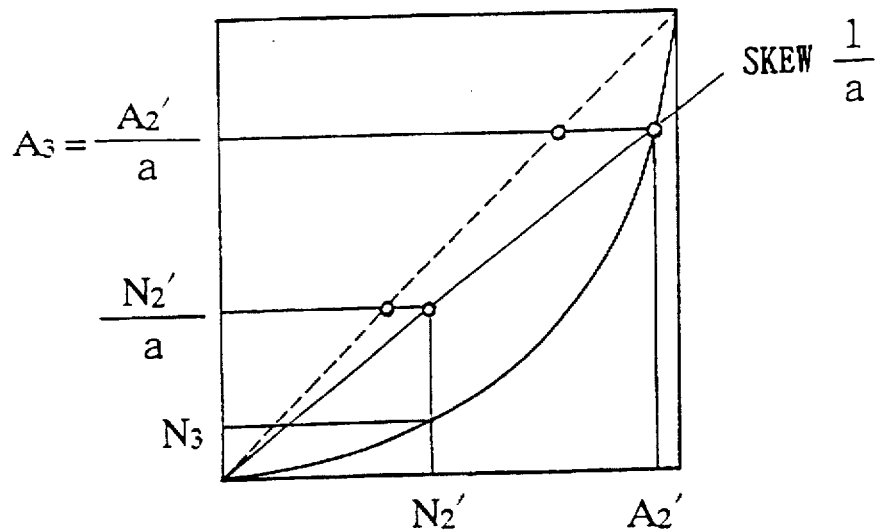
FIG. 9 is a characteristic curvilinear diagram explaining a non-linear inverse quantization characteristic.

The output S403 of the non-linear inverse quantization circuit 403 for high-frequency signal is shown in (e). The inverse quantization characteristics are shown in FIG. 9. The non-linear inverse quantization makes the maximum value of signal $A_3 = A_2'/a$. In this case, the maximum value of distortion becomes $N_3$. When the non-linear inverse quantization is not performed, the maximum value of distortion is $N_2'/a$. When it is compared with a case where no non-linear quantization is performed, it is found that the maximum value of distortion is reduced by $N_1 - N_3$.

With the aforementioned manner, the high-frequency component is emphasized in order to be encoded, so that distortion can be reduced. As described above, the non-linear quantizing operation is performed by block input to the conversion circuit (in this embodiment, the DCT conversion circuit). This is because deterioration caused by the conversional encoding is confined to a block. This allows to prevent loss of more information than necessary across blocks.

Figure 1B:
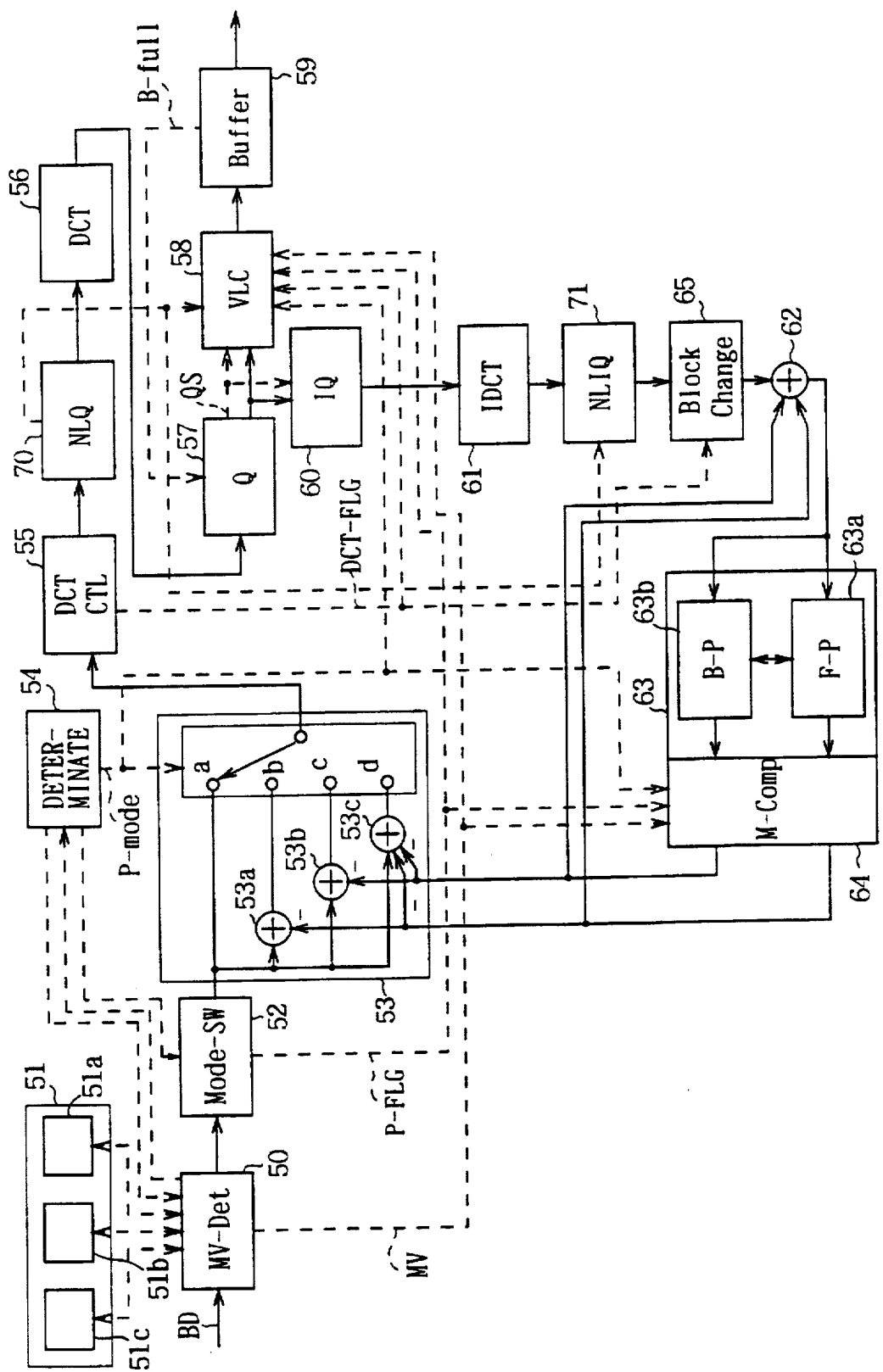
FIG. 1(B) is a block diagram showing a construction of the other embodiment of the motion picture encoding apparatus according to the present invention.
Figure 10A:
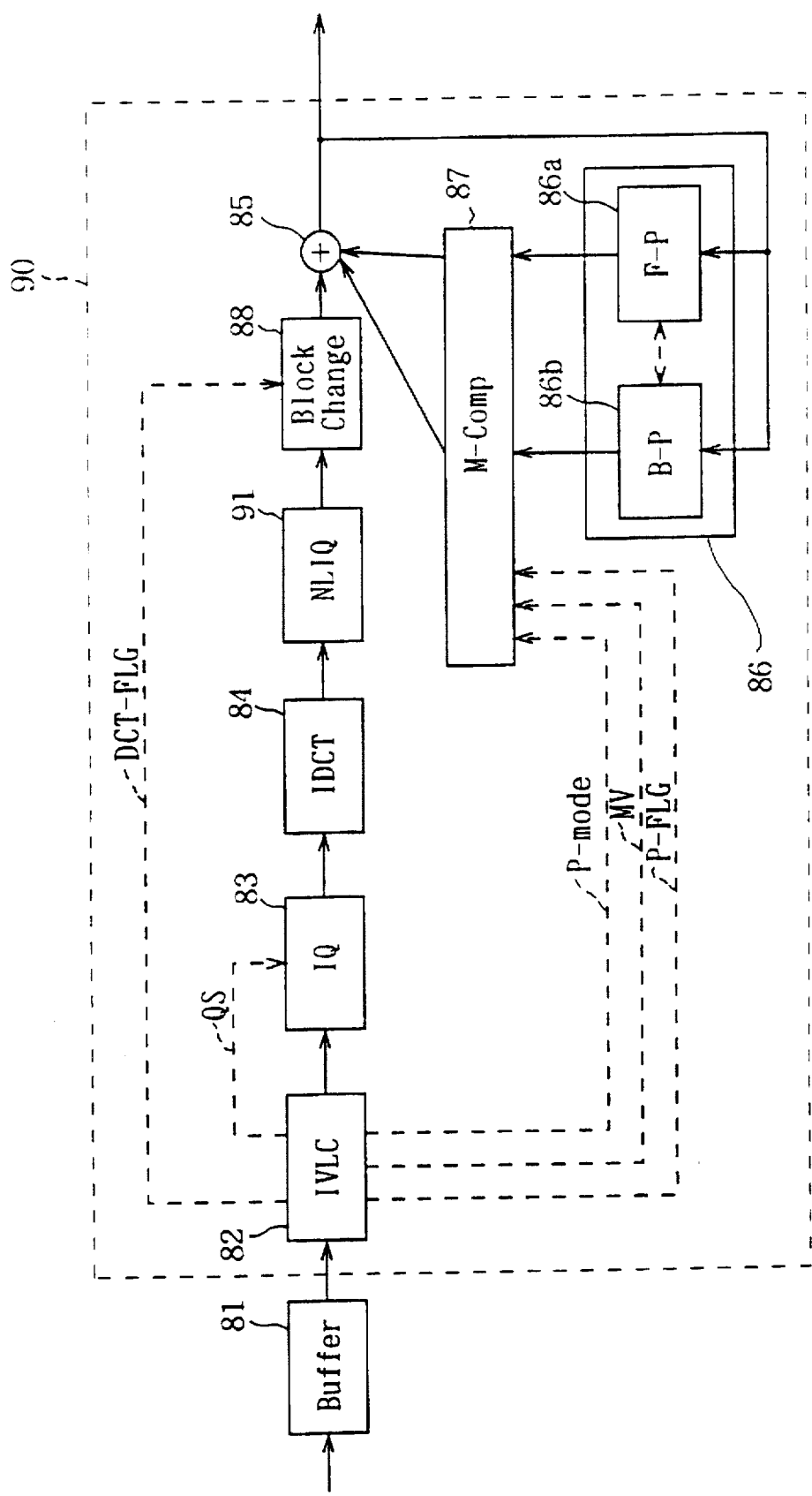
FIG. 10(A) is a block diagram showing a construction of an embodiment of a motion picture decoding apparatus according to the present invention.

FIG. 10(A) shows a motion picture decoding apparatus according to the first embodiment. Because it is similar to a conventional apparatus except for a non-linear inverse quantization circuit (NLIQ) 91, description is omitted for components already described in relation to the conventional apparatus. The non-linear inverse quantization circuit 91 is described next. The non-linear inverse quantization circuit 91 is similar to the non-linear quantization circuit 71 described in respect to FIGS. 1 and 4(A), and is for performing an operation opposite to that of the non-linear quantization circuit 70. In this case, the non-linear inverse quantization circuit 91 has non-linear inverse quantization characteristics opposite to those of the non-linear quantization circuit 70.

In this embodiment, the non-linear quantization circuit is provided immediately preceding the DCT circuit or immediately following the inverse DCT circuit, so that it is possible to maintain coordination between the picture signal encoding apparatus and the picture signal decoding apparatus. Also, in the method according to this embodiment, it is possible to reproduce minimum picture even when the picture signal decoding apparatus does not have a non-linear inverse quantization circuit. In a case where the picture signal decoding apparatus does not have a non-linear inverse quantization circuit, the signal with an emphasized high-frequency component is decoded and displayed as is. The picture decoding apparatus in such a case is similar to the conventional one.

In addition, the non-linear inverse quantizer 91 does not necessarily have characteristics exactly opposite to those of the non-linear quantizer 70. If the deemphasis of the inverse quantization characteristics is larger than the emphasis of the quantization characteristics, the decoded picture effected a low-pass filtered effect can be obtained. In the opposite state, the decoded picture with a contour-accentuated effect can be obtained.

With the above arrangement, the SN ratio can be effectively improved by associatively applying preprocessing and postprocessing with non-linear characteristics to a signal band the SN ratio of which tends to be degraded by encoding. That is, in a signal band with a poor SN ratio, mosquito noise can be reduced while reduction of fine pattern information of a picture can be suppressed, whereby it becomes possible to suppress the reduction of patterns in a flat area of picture signals where distortion of the picture is conventionally difficult to be distinguished from fine patterns, so that the SN ratio and visual impression can be improved.

Furthermore, because the distortion in conversional encoding occurs when being confined to the block to be used for the conversion, it becomes possible to decrease the propagation of mosquito noise along the time axis by confining the operation of above preprocessing and post-processing in the block where conversional encoding are performed. This allows to reduce the fluctuation in distortion noise which is caused by propagation of the noise along the time axis conventionally because of the use of motion compensation prediction, so that the visual impression can be improved.

(2) Second Embodiment

Figure 11:
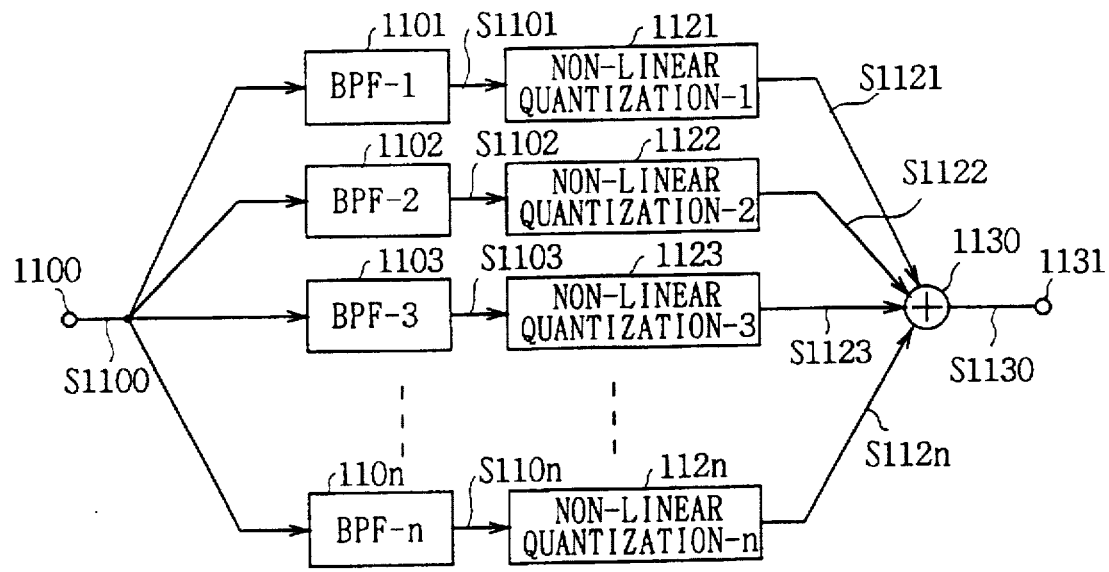
FIG. 11 is a block diagram showing a construction of a non-liner quantization circuit according to a second embodiment.

The second embodiment is a variation of the first embodiment, and has the same arrangement as the first embodiment described above except for the non-linear quantization circuit (NLQ) 70 and the non-linear inverse quantization circuits (NLIQ) 71 and 91. More specifically, the internal arrangement of the non-linear quantization circuit 70 in the second embodiment is shown in FIG. 11. A picture signal S1100 input to the non-linear quantization circuit 70 is input to band-pass filters 1 (1101)–n (110n) by the block unit.

The band-pass filters 1 (1101)–n (110n) are filters having different passing frequency bands. The band-pass filter 1 (1101) has the lowest passing frequency band (low-pass filter), while the band-pass filter n (110n) has the highest passing frequency band (high-pass filter).

Output signals S1101–S110n from the band-pass filters are input to the first non-linear quantization circuit (1121) to n-th non-linear quantization circuit (112n), respectively. The non-liner quantization with different quantization characteristics is executed to each frequency component of the input signal S1100 corresponding to the frequency.

Figure 13A:
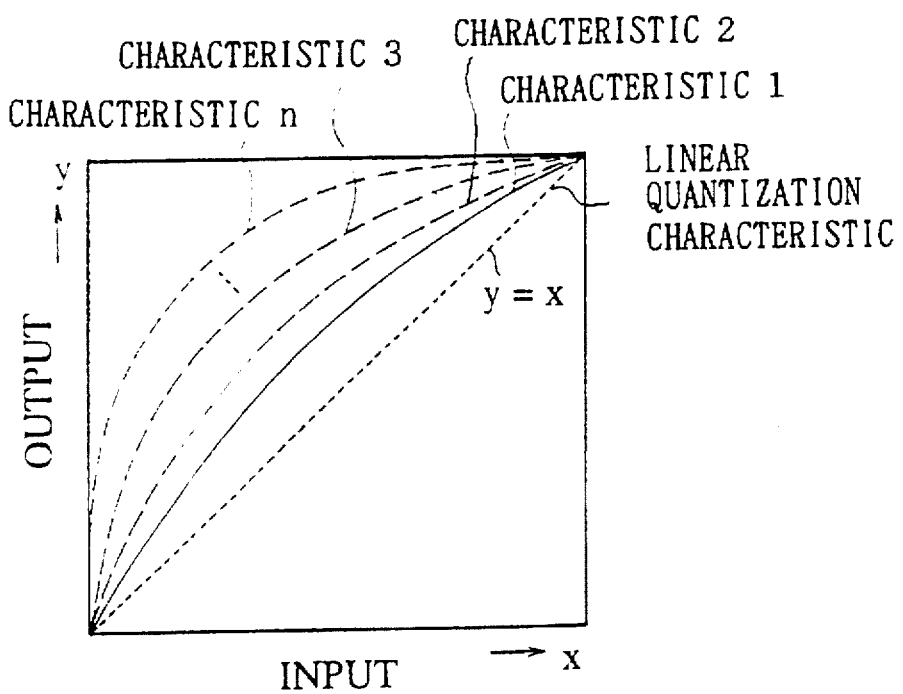
FIGS. 13(A) and 13(B) are characteristic curvilinear diagrams explaining the quantization characteristic of the non-liner quantization circuit.

Examples of quantization characteristics for each non-linear quantization circuit shown in FIG. 11 are shown in FIG. 13(A). The frequency characteristics of the first non-linear quantization circuit (1121) are characteristics 1 in FIG. 13(A), and the frequency characteristics of the n-th non-linear quantization circuit (112n) are characteristics n. The quantization characteristics are used which are close to the linear quantization characteristics (y=x) as the frequency component becomes lower. Therefore, the higher the frequency component is, the higher emphasis is provided. Output signals S1121–S112n from the non-linear quantization circuits are input to an adder 1130. The adder 1130 adds and outputs each frequency component after non-linear quantization (S1130).

Figure 12:
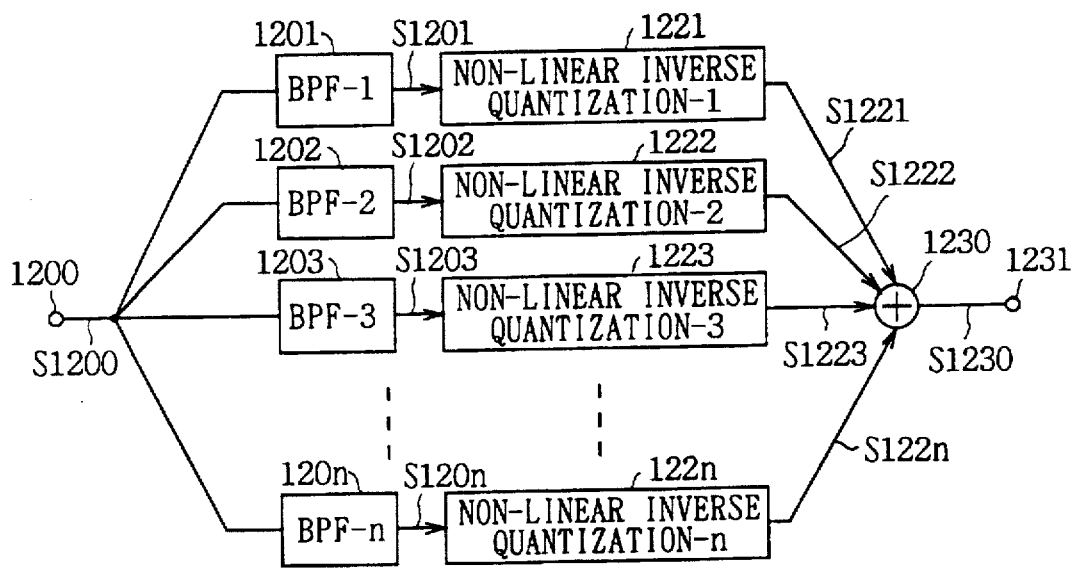
FIG. 12 is a block diagram showing a construction of a non-liner inverse quantization circuit according to a second embodiment.

Next, the non-linear inverse quantization circuits 71 and 91 in this embodiment are explained by referring to FIG. 12. FIG. 12 shows construction of the non-linear inverse quantization circuits 71 and 91. That is, an output signal S1200 from the inverse DCT circuit is input to the first band-pass filter (1201) to n-th band-pass filter (120n). The first band-pass filter (1201) to n-th band-pass filter (120n) are filters having different passing frequency bands. The first band-pass filter (1201) has the lowest passing frequency band (low-pass filter), while the n-th band-pass filter (120n) has the highest passing frequency band (high-pass filter).

Output signals S1201–S120n from the band-pass filters (1201–120n) are input the first to non-linear inverse quantization circuit (1221) to the n-th non-linear inverse quantization circuit (122n), respectively. The non-linear inverse quantization with different quantization characteristics is executed to each frequency component of the signal S1200 from the inverse DCT circuit corresponding to the frequency.

Figure 14A:
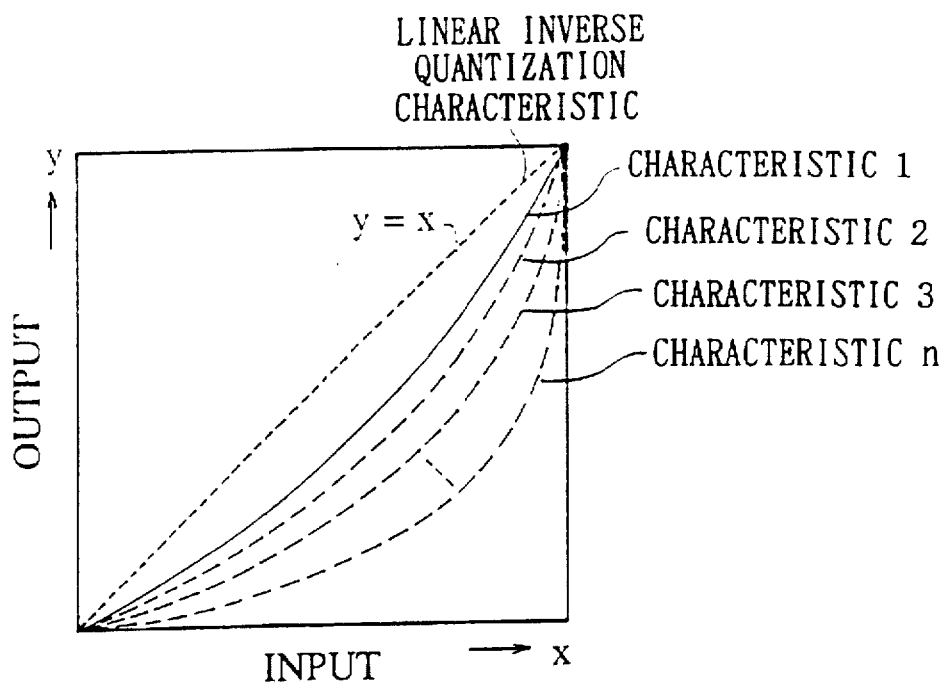
FIGS. 14(A) and 14(B) are characteristic curvilinear diagrams explaining the inverse quantization characteristic of the non-linear inverse quantization circuit.

Examples of inverse quantization characteristics for each non-linear inverse quantization circuit shown in FIG. 12 are shown in FIG. 14(A). The frequency characteristics of the first non-linear inverse quantization circuit (1221) are characteristics 1 in FIG. 14(A), while the quantization characteristics of the n-th non-linear inverse quantization circuit (122n) are characteristics n. The inverse quantization characteristics are used which are close to the linear quantization characteristics (y=x) as the frequency component becomes lower. In this case, the respective inverse quantization characteristics must perform operations opposite to the quantization characteristics. For example, the inverse quantization characteristics 1 must perform operations opposite to the quantization characteristics 1. That is, the quantization characteristics 1 should be symmetrical to the inverse quantization characteristics 1 in respect to y=x.

Output signals S1221–S122n from the non-linear inverse quantization circuits are input to an adder 1230. The adder 1230 adds and outputs each frequency component after non-linear inverse quantization (S1231). These non-linear inverse quantization circuits 71 and 91 restore the emphasized high-frequency component to its original level. As described above, in the second embodiment, the non-linear quantization and the non-linear inverse quantization are performed with difference non-linear quantization characteristics in accordance with the frequency component of the input picture signal. Thus, in the case of the second embodiment, the quantization characteristics are made different according to the frequency component of the input signal, so that the SN ratio and visual impression can be further improved.

(3) Third embodiment

The third embodiment is also a variation of the first embodiment, and is the same as the first embodiment except for the non-linear quantization circuit 70 and the variable-length encoding circuit 58. The picture encoding apparatus of the third embodiment has the general construction shown in FIG. 1(B). The construction of the non-linear quantization circuit 70 is given in FIG. 2 (B). In the third embodiment, a quantization circuit controller 206 adaptively switches quantization characteristics used by the non-linear quantization circuit 203 for high-frequency signal.

Figure 13B:
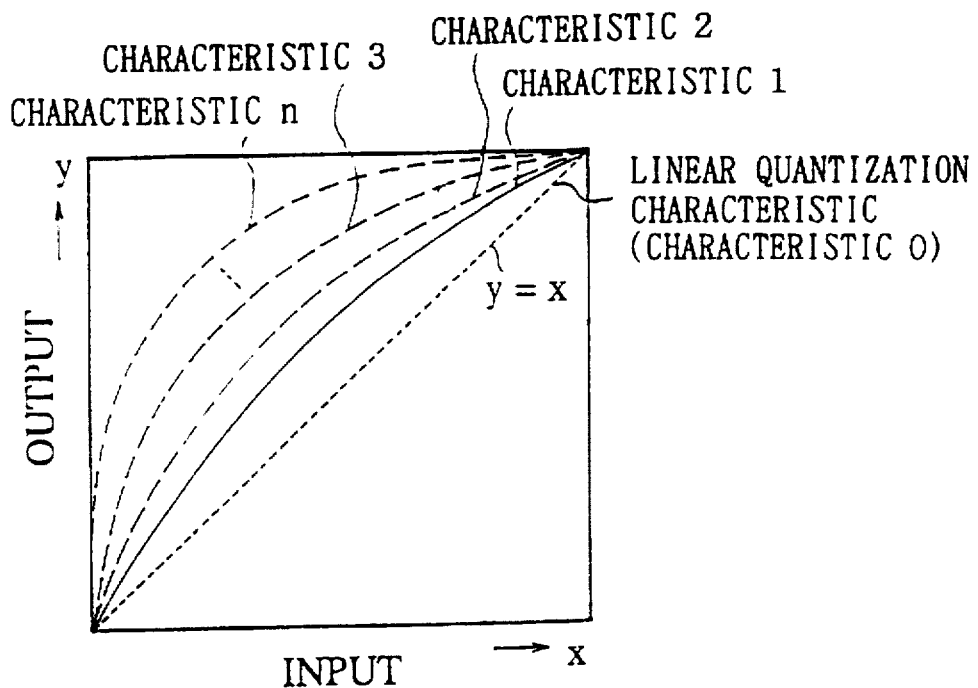

The quantization circuit controller 206 checks the characteristic of the input picture signal S201 or the high-frequency signal S203 for each block, and determines quantization characteristic according to above characteristic. In this case, signal QL indicating the quantization characteristics to be used is output to the non-linear quantization circuit 203 for high-frequency signal. The quantization characteristics are given, for example, by FIG. 13(B). The characteristics of input picture signal means, for example, edge information, amplitude information of the input signal, or correlation between the luminance and the color difference signals. Concretely, when there is an edge part of the picture in the block, the quantization characteristic in order to emphasize this edge part, namely, the non-linear quantization characteristic corresponding to larger value "n" in FIG. 13(B) is selected. Furthermore, the larger the amplitude of signal in a block is, the larger value of "n" in FIG. 13(B) the non-linear quantization characteristic corresponds to is selected. Further, when the non-linear processing is performed to the blocks having low luminance value and in which one of corresponding color difference signal, Cb or Cr, is high, noise in the original picture tends to stand out. Therefore, the linear quantization characteristic (characteristic 0) in FIG. 13(B) is selected. The signal QL showing quantization characteristic is also output to a variable-length encoding circuit 58. The variable-length encoding circuit 58 variable-length encodes signal QL indicating the quantization characteristics, and transmits it.

Figure 10B:
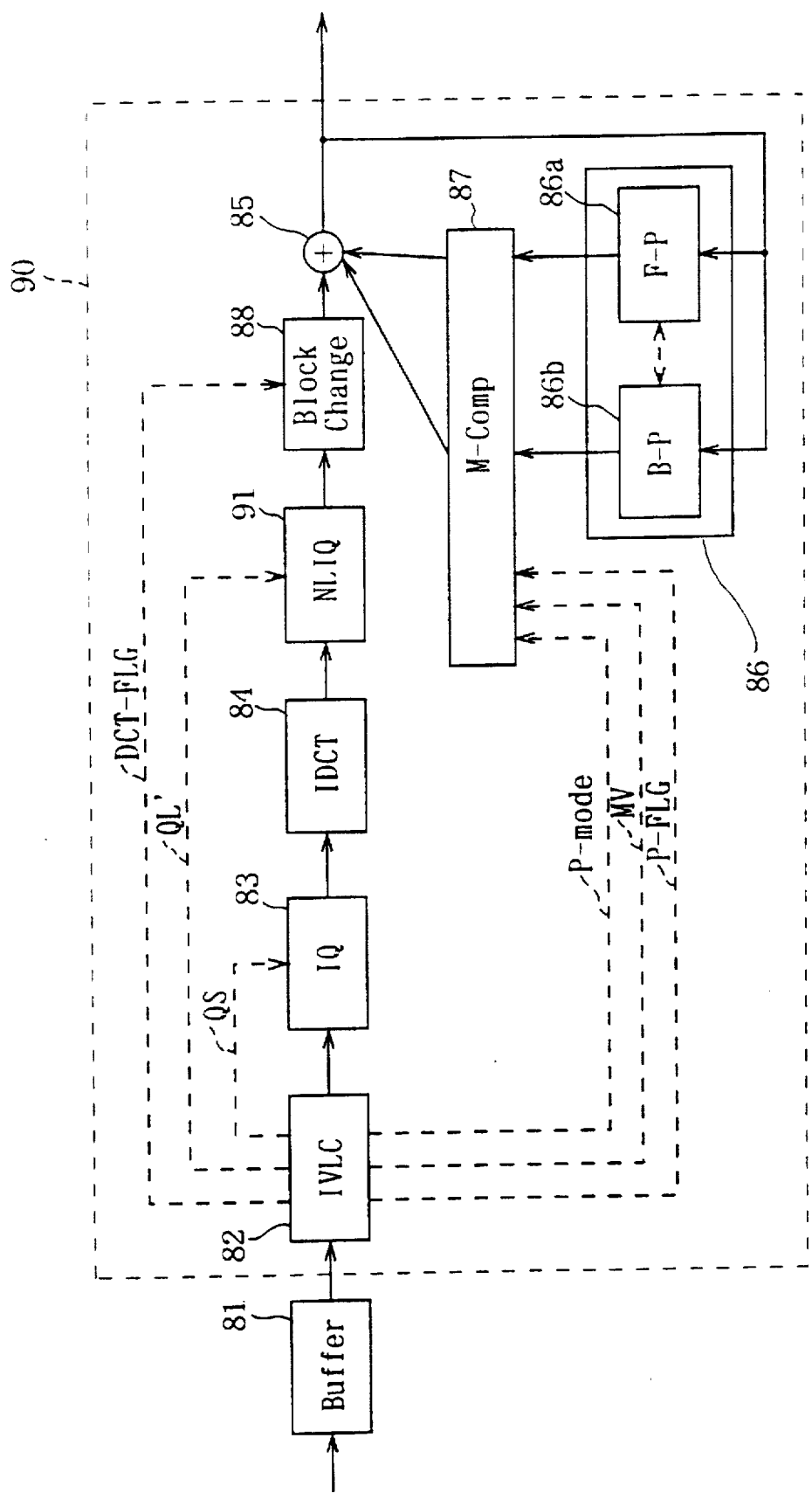
FIG. 10(B) is a block diagram showing a construction of the other embodiment of a motion picture decoding apparatus according to the present invention.

The general construction of the picture decoding apparatus of this embodiment is same as the first embodiment except for a variable-length decoding circuit 82 and an inverse quantization circuit 91, which is given in FIG. 10(B). The constructions of the non-linear inverse quantization circuits 71 and 91 are given by FIG. 4(B). In the third embodiment, an inverse quantization circuit controller 406 adaptively switches the inverse quantization characteristics to be used by a non-linear inverse quantization circuit 403 for high-frequency signal in block units. The signal QL indicating the quantization characteristics transmitted from the picture signal encoding apparatus is decoded at the variable-length decoding circuit 82, and is output to the non-linear inverse quantization circuit 91 as signal QL' indicating the inverse quantization characteristics.

Figure 14B:
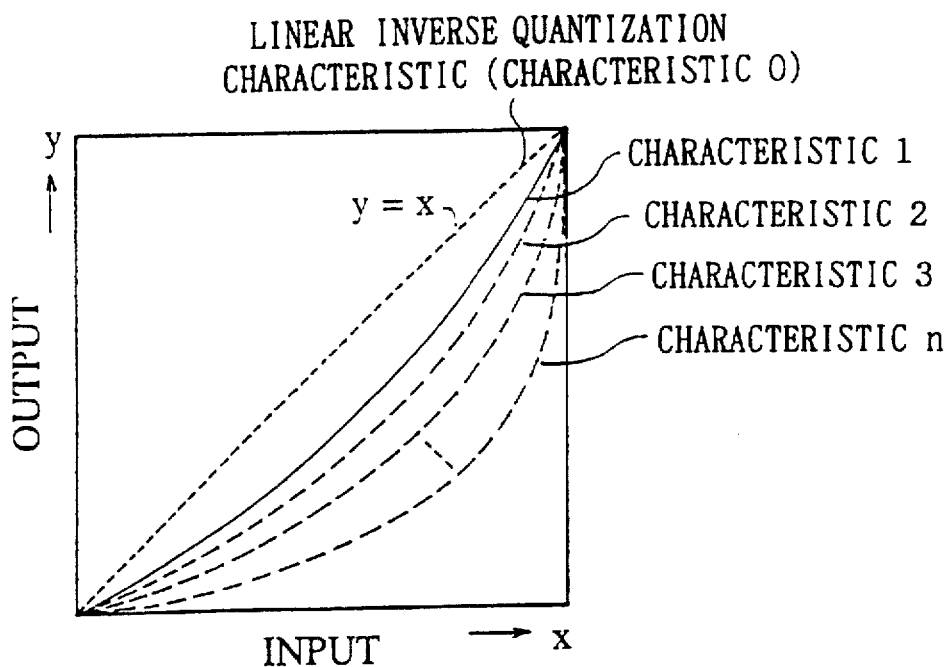

The inverse quantization circuit controller 406 determines the inverse quantization characteristics according to the signal QL' indicating the inverse quantization characteristics in block units, and outputs them to the non-linear inverse quantization circuit 403 for high-frequency signal. The non-linear inverse quantization circuit 403 for high-frequency signal switches the inverse quantization characteristics according to the signal QL' indicating the inverse quantization characteristics in block units. The inverse quantization characteristics are given, for example, by FIG. 14(B). In this manner, in the case of the third embodiment, the quantization characteristics is adaptively switched according to the type of input picture signal, so that the SN ratio and the visual impression can be further improved.

As described above, in this embodiment, the inverse quantization characteristic is adaptively switched according to the transmitted QL'. However, in the case where it is necessary to add effects such as contour accentuation to the decoded picture, the inverse quantization characteristic can be adaptively controlled in accordance with the decoded picture signal S401 or the high-frequency component S403 of the decoded picture signal, not in accordance with QL'.

(4) Fourth embodiment

Figure 15A:
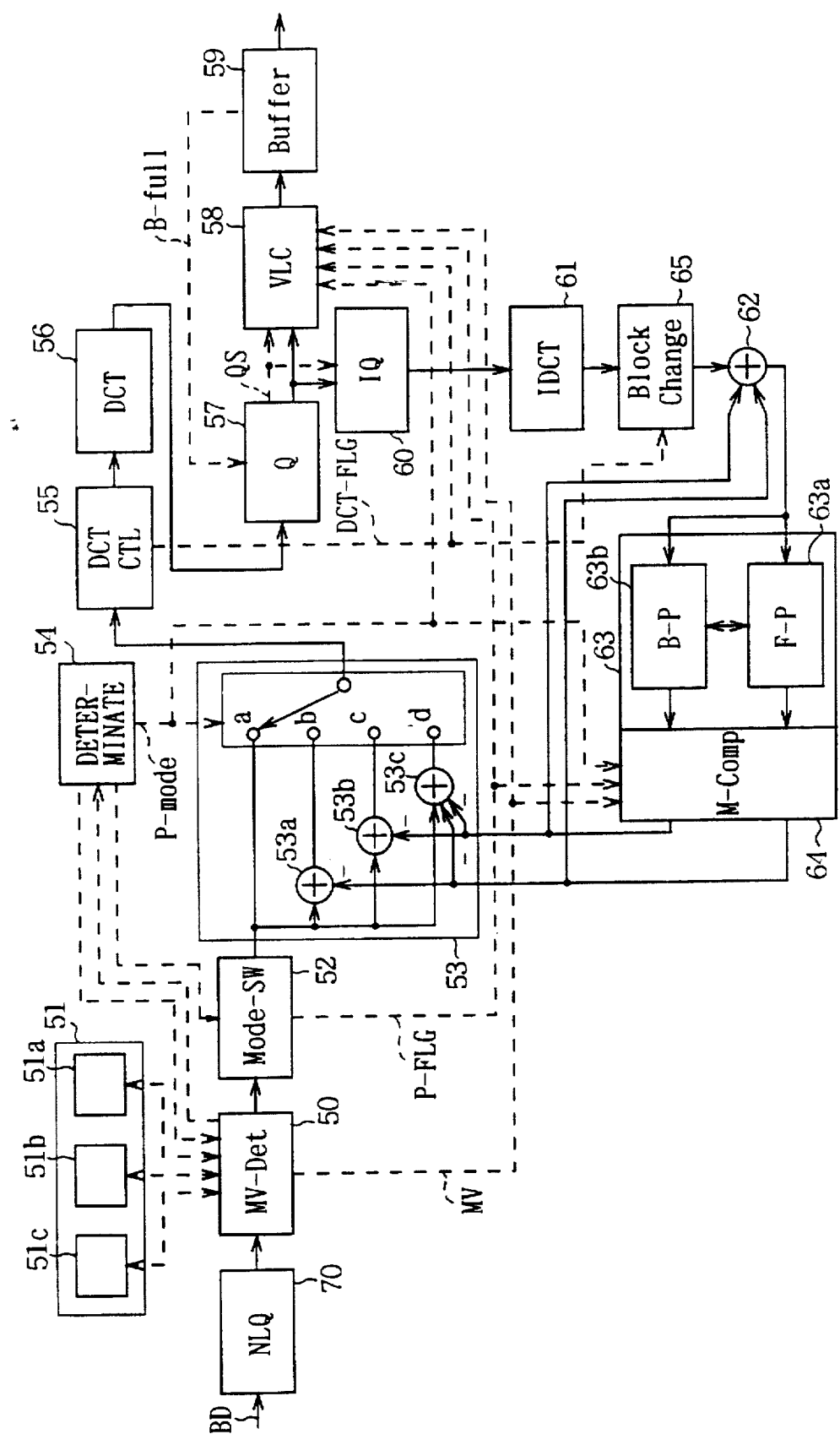
FIG. 15(A) is a block diagram showing a construction of a motion picture encoding apparatus according to a fourth embodiment.
Figure 15B:
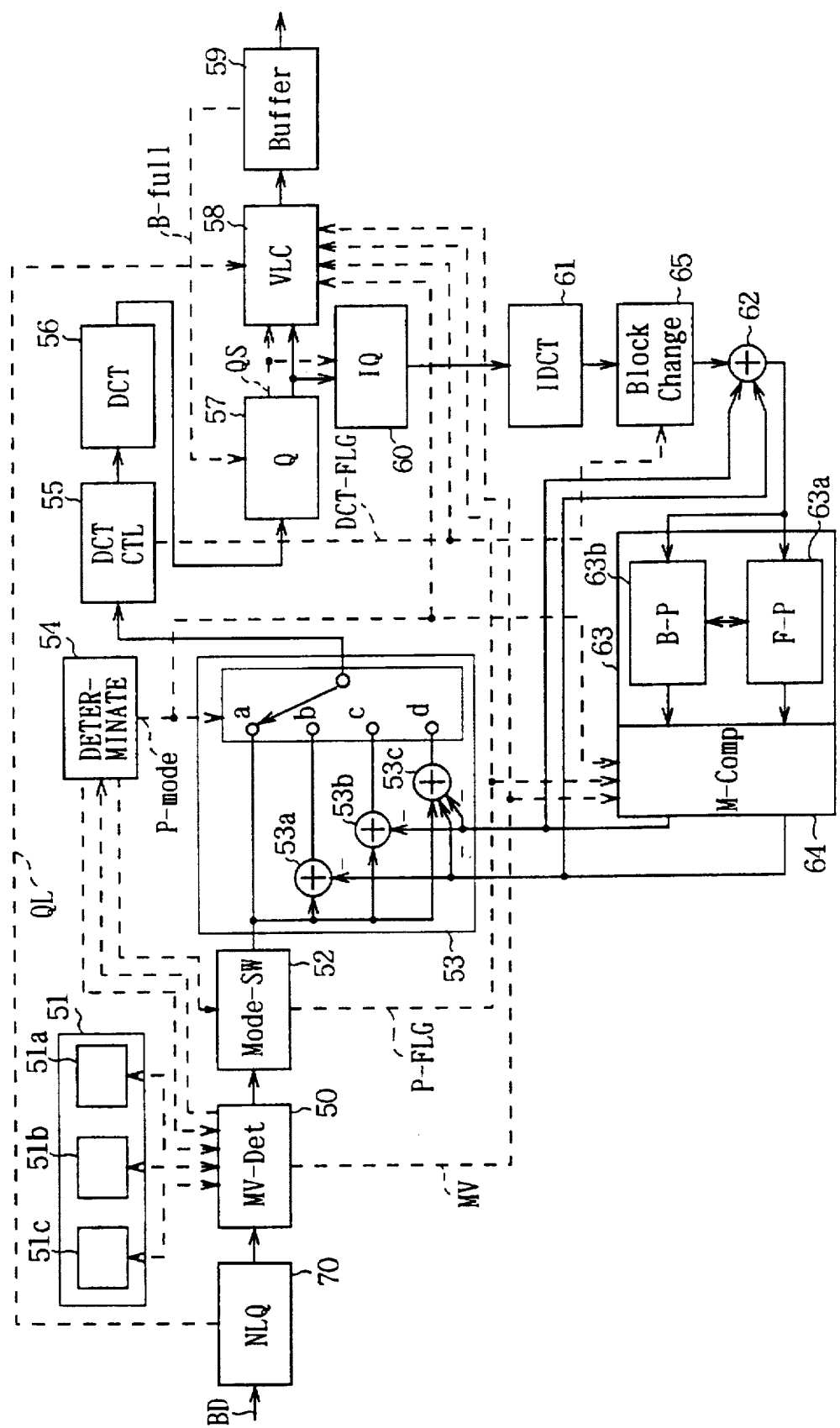
FIG. 15(B) is a block diagram showing a construction of a motion picture encoding apparatus according to a sixth embodiment.

The fourth embodiment is effective in the case where a non-liner quantization circuit and a non-linear inverse quantization circuit cannot installed preceding and following a conversion circuit (in this embodiment, DCT and IDCT circuits). The construction of a picture signal encoding apparatus of the fourth embodiment is shown in FIG. 15(A). This embodiment is different from the first embodiment in that the non-linear quantization circuit 70 is positioned at the top of the encoding apparatus. In FIG. 15(A), the non-linear quantization circuit 70 is positioned preceding a motion vector detection circuit 50. However, it can be positioned following the motion vector detection circuit 50, that is, between the motion vector detection circuit 50 and the prediction mode switching circuit 52.

Figure 2A:
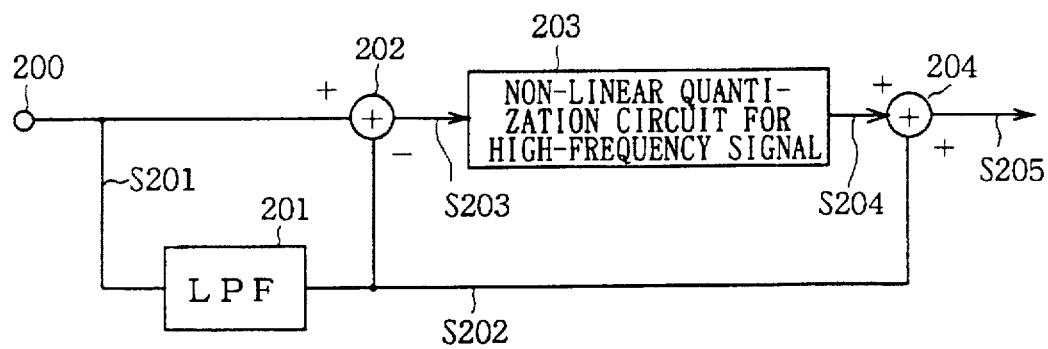
FIGS. 2(A) and 2(B) are block diagrams showing construction of a non-linear quantization circuit.
Figure 2B:
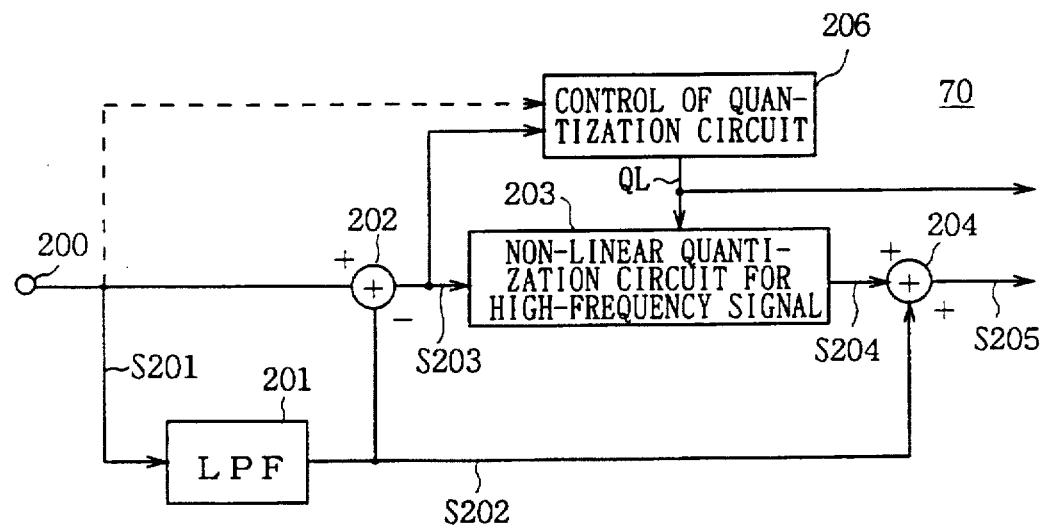

The construction of the non-linear quantization circuit 70 is shown in FIG. 2(A) as in the first embodiment. In this embodiment, because the non-linear quantization is performed before motion compensation, the signal itself input to the DCT circuit cannot be processed. The non-linear quantization is performed in block units to be input to the conversion circuit (DCT circuit) as in the first embodiment. In this case, when interframe or interfield encoding is not performed, that is, in case of an intra-frame encoding macroblock, it is possible to obtain the same result as in the first embodiment.

Figure 16A:
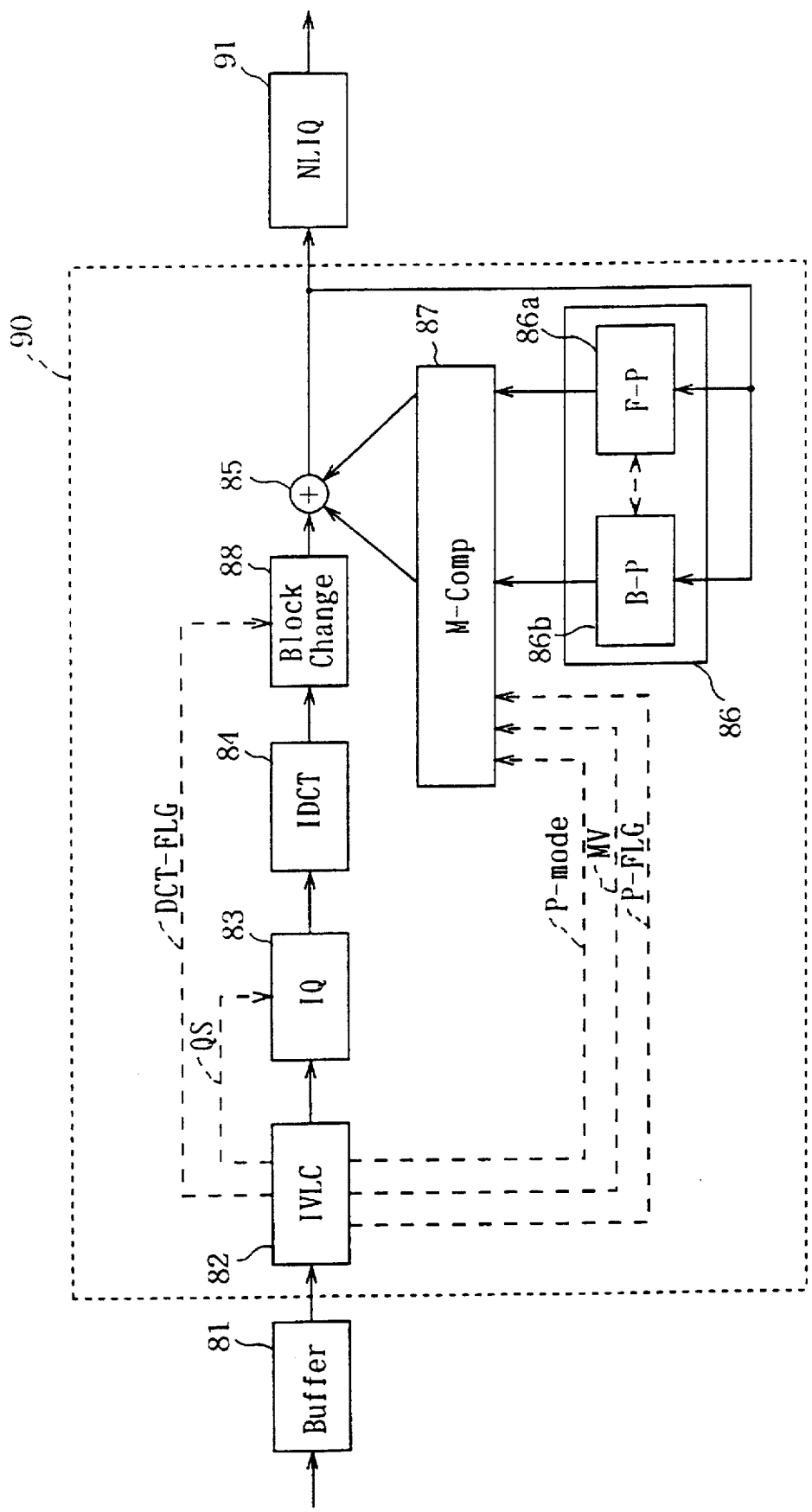
FIG. 16(A) is a block diagram showing a construction of a motion picture decoding apparatus according to the fourth embodiment.
Figure 16B:
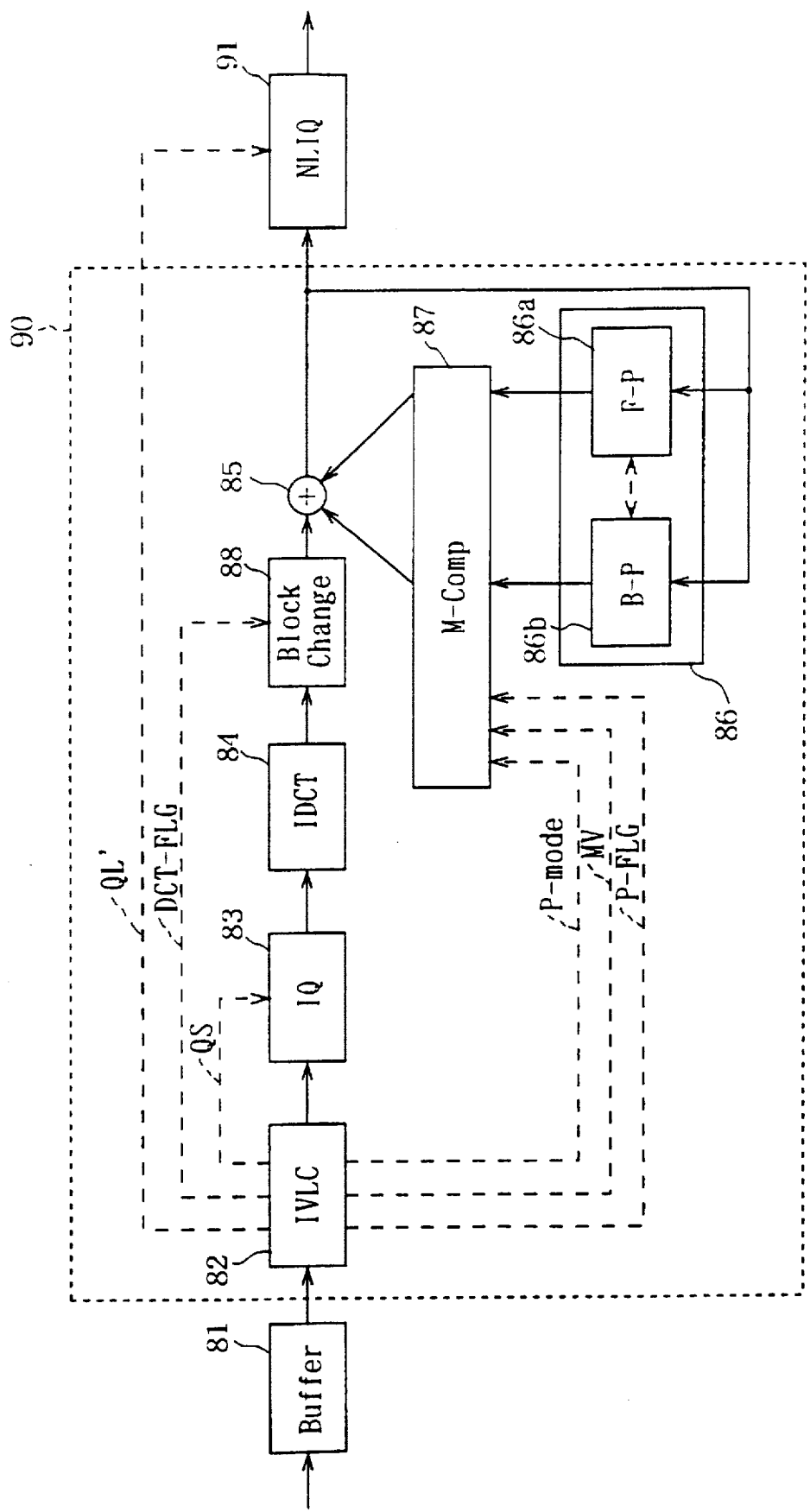
FIG. 16(B) is a block diagram showing a construction of a motion picture decoding apparatus according to a sixth embodiment.
Figures 17A, 17B:
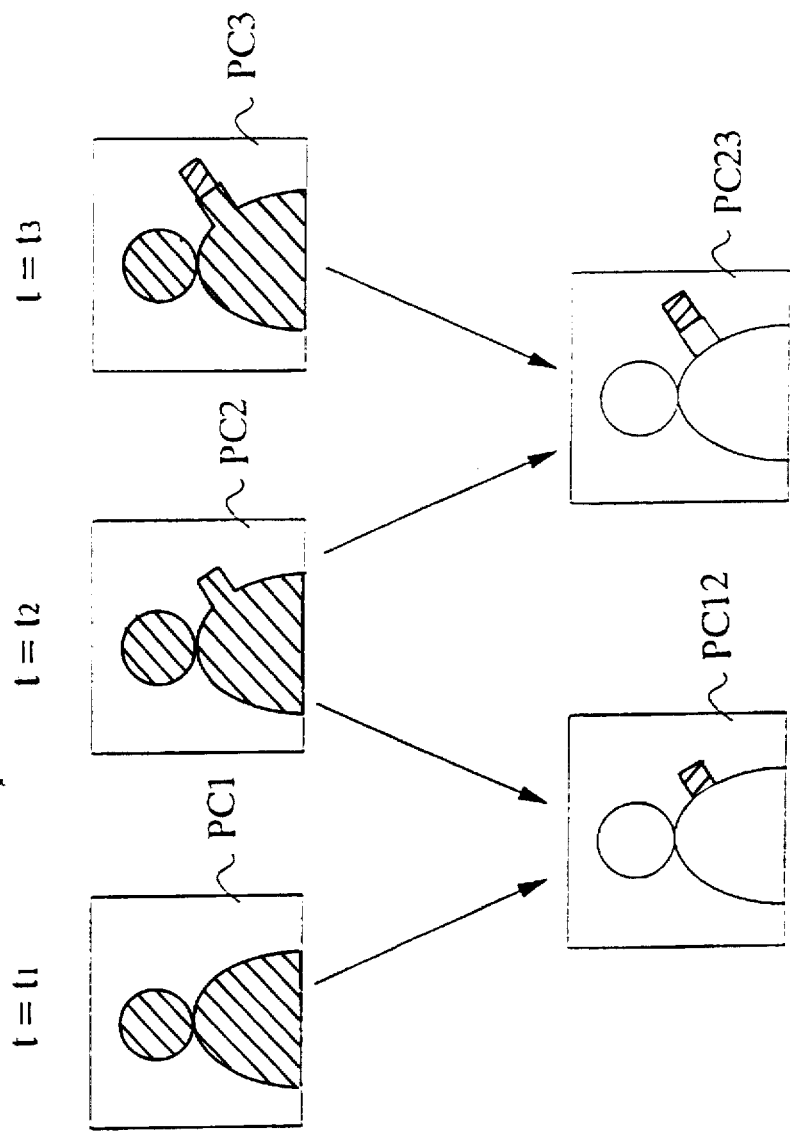
FIG. 17 is a schematic diagram explaining a principle of the compressive encoding of a motion picture signal when an inter-frame correlation is utilized.
Figure 19:
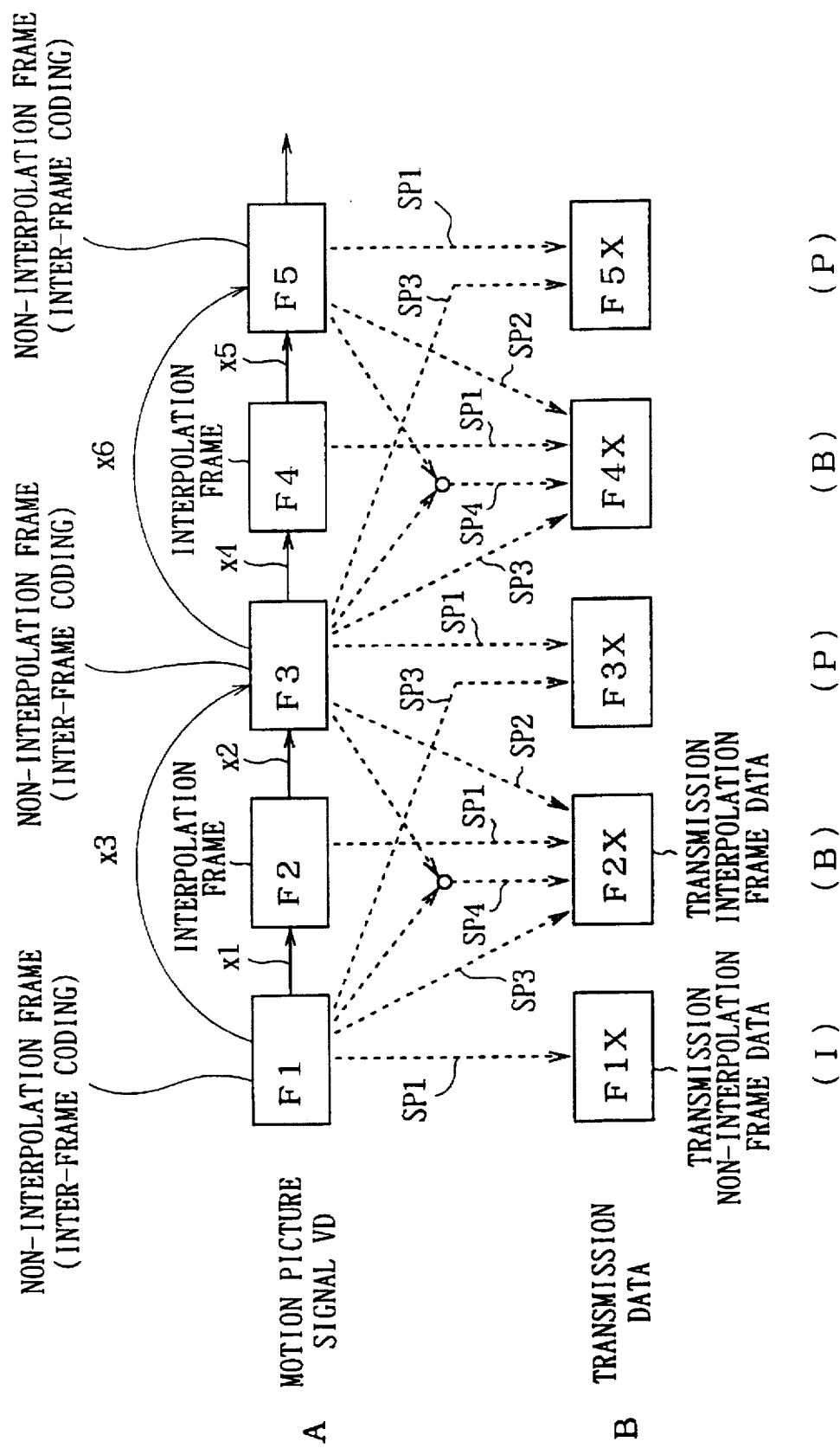
FIG. 19 is a schematic diagram explaining a principle of encoding a motion picture signal.
Figure 20:
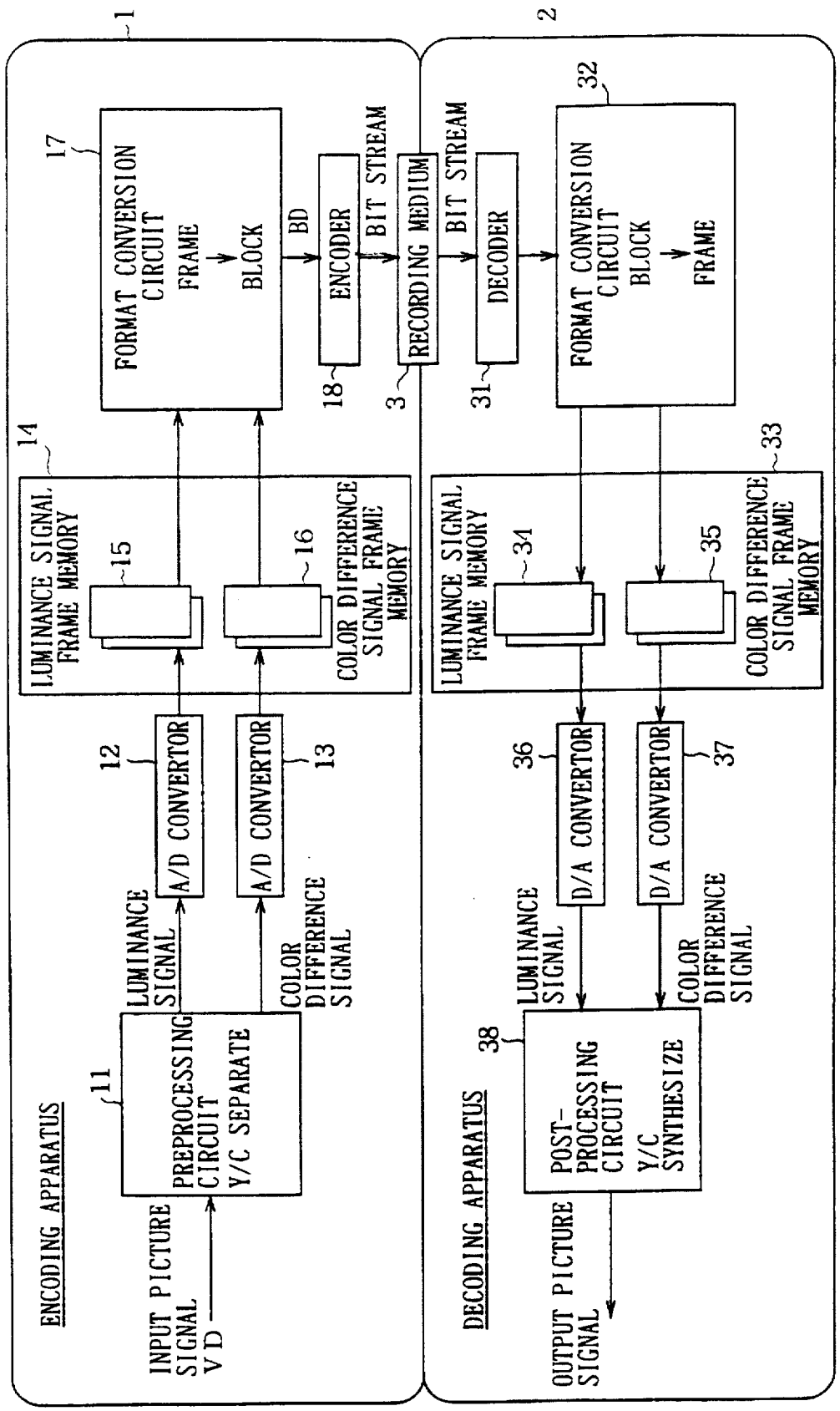
FIG. 20 is a block diagram showing a constructions of an encoding apparatus and a decoding apparatus for a picture signal.
Figure 21:
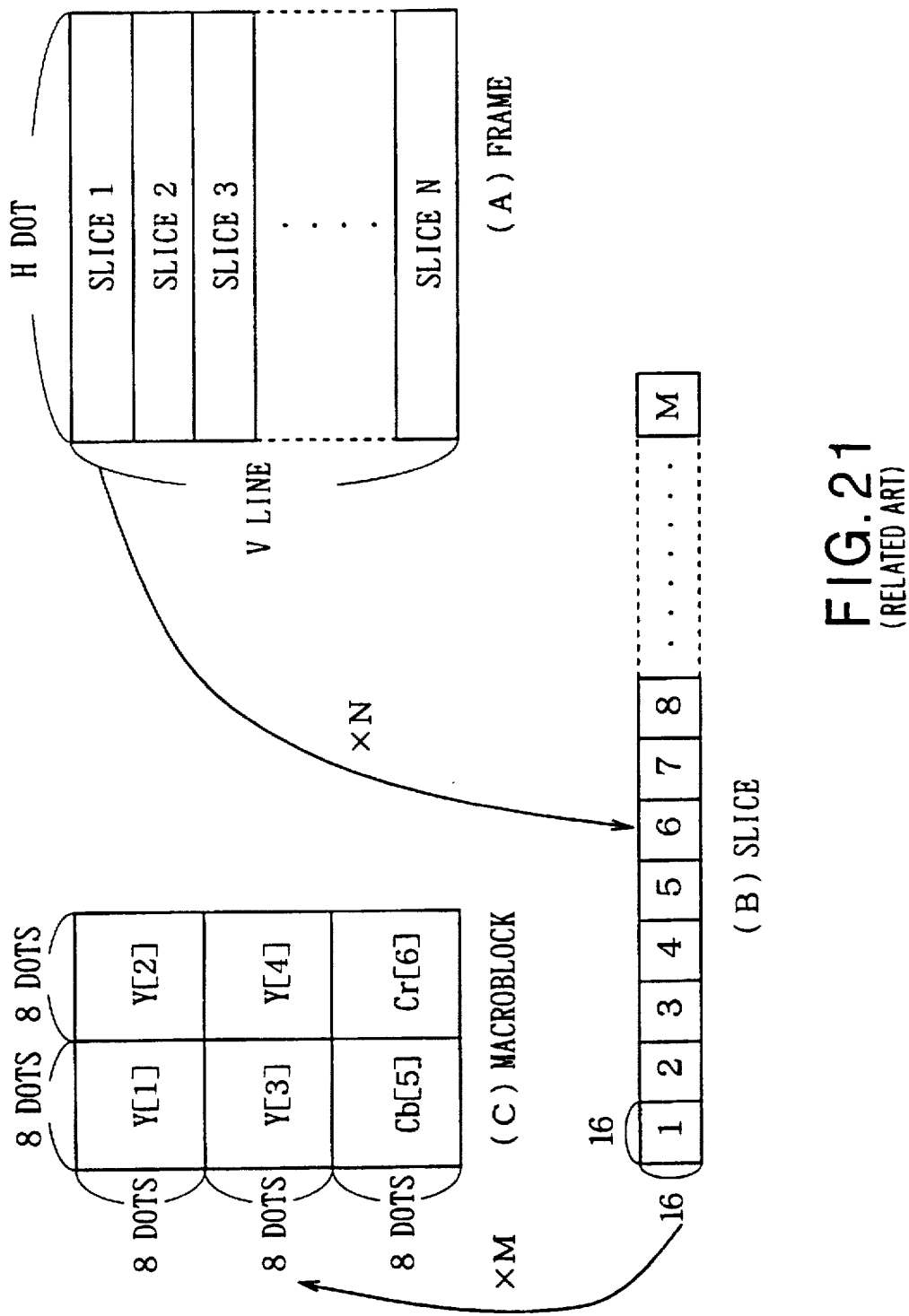
FIG. 21 is a schematic diagram explaining operation of format conversion of the format conversion circuit in FIG. 20.

A picture signal decoding apparatus of the fourth embodiment is shown in FIG. 16(A). This embodiment is different from the first embodiment in that the non-linear inverse quantization circuit 91 is positioned at the end of the decoding circuit. The picture signal is decoded in the decoding circuit 90, and then performed non-linear inverse quantization at the non-linear inverse quantization circuit 91. The construction of the non-liner inverse quantization circuit 91 is given by FIG. 4(A) as in the first embodiment. The operation of the non-linear inverse quantization circuit 91 is similar to that of the first embodiment.

In the fourth embodiment, although the coordination between the non-linear quantization and the non-linear inverse quantization by the encoding apparatus and the decoding apparatus is not always maintained because the non-linear quantization circuit is in a stage preceding the motion compensation circuits it is possible to eliminate distortion caused by conversional encoding in accordance with a principle similar to the principle described in the first embodiment. Thus, for the fourth embodiment, even if the non-linear quantization circuit and the non-linear inverse quantization circuit cannot be installed immediately preceding and following the conversion circuit, the non-linear quantization circuit and the non-linear inverse quantization circuit are provided at the top of the encoding apparatus and at the end of the decoding apparatus, thus it is possible to reduce mosquito noise in a signal band with a poor SN ratio, and to prevent the loss of fine information in a picture.

(5) Fifth embodiment

The fifth embodiment is a variation of the fourth and the second embodiments. It is the same as the fourth embodiment except for the non-linear quantization circuit and the non-linear inverse quantization circuit. The general construction of a picture signal encoding apparatus and a picture signal decoding apparatus of the fifth embodiment is same as the fourth embodiment and is shown in FIGS. 15(A), 15(B), 16(A), and 16(B). The construction of the non-linear quantization circuit 70 of the fifth embodiment is given by FIG. 11 as in the second embodiment. Furthermore, the construction of the non-linear inverse quantization circuit 71 of the fifth embodiment is given by FIG. 12 as in the second embodiment. The fifth embodiment is the fourth embodiment modified to adaptively change the non-linear quantization characteristics according to the frequency component of the input picture signal as in the second embodiment.

(6) Sixth embodiment

The sixth embodiment is a variation of the fourth and the third embodiments. It is the same as the fourth embodiment except for the non-linear quantization circuit, the variable-length encoding circuit, the variable-length decoding circuit, and the non-linear inverse quantization circuit. A picture signal encoding apparatus and a picture signal decoding apparatus of the sixth embodiment have the construction shown in FIGS. 15(B) and 16(B). The construction of the non-linear quantization circuit 70 of the sixth embodiment is given by FIG. 2(B) as in the third embodiment.

Figure 4B:
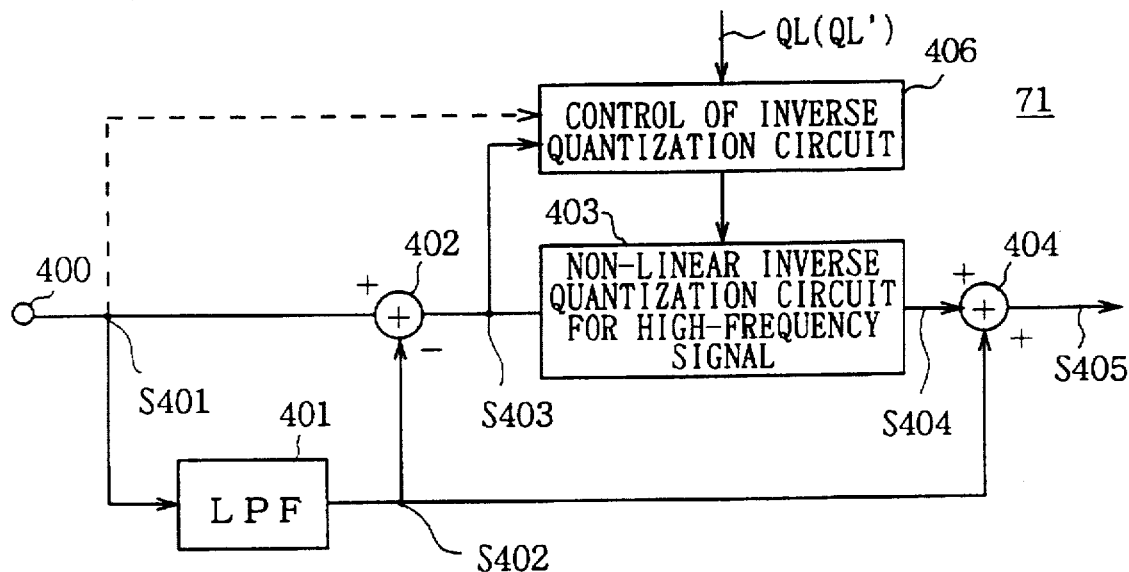

Furthermore, the construction of the non-linear inverse quantization circuit 71 of the sixth embodiment is given by FIG. 4(B) as in the third embodiment. The sixth embodiment is the fourth embodiment modified to adaptively change the non-linear quantization characteristics in block units according to the characteristics of the input picture signal as in the third embodiment. A signal showing the non-linear quantization characteristics is variable-length encoded, and is transmitted to the picture signal decoding apparatus. The picture signal decoding apparatus determines the non-linear inverse quantization characteristics from the signal showing transmitted non-linear quantization characteristics.

As described above, according to the present invention, the SN ratio can be effectively improved by associatively applying preprocessing and postprocessing with non-linear characteristics to a signal band in which the SN ratio tends to be degraded by encoding. That is, in a signal band with a poor SN ratio, mosquito noise can be reduced without reducing of the fine pattern information of a picture, thereby it becomes possible to suppress the reduction of patterns in a flat region of picture signals even where distortion of the picture is conventionally difficult to distinguish from fine patterns, so that a method for encoding motion picture, a method for decoding motion picture, a motion picture recording medium, and a motion picture encoding apparatus can be realized in that the SN ratio and the visual impression can be improved.

Furthermore, because the distortion in conversional encoding occurs and is confined to the block being used for the conversion, it becomes possible to decrease propagation of mosquito noise along the time axis by performing the operation of above preprocessing and postprocessing by confining in block units for the conversion and encoding. This reduces the fluctuation of noise caused by the propagation of the distortion noise along the time axis because of the conventional use of motion compensation prediction, so that a method for encoding motion picture, a method for decoding motion picture, a motion picture recording medium, and a motion picture encoding apparatus can be realized in which the visual impression can be improved.

Industrial Applicability

The method for encoding picture signal and the picture signal encoding apparatus of the present invention can be utilized to a videosoft making apparatus for compressing a digital video signal for recording it on a recording medium such as a disc or a tape. Furthermore, the method for encoding picture signal and the picture signal encoding apparatus of the present invention can be utilized to a signal distribution apparatus for compressing a digital video signal and for transmitting to a wired or wireless transmission path in systems such as CATV, satellite broadcast, television conference, television telephone, video on demand.

Furthermore, the recording medium of the present invention can be utilized to a digital video disc for general consumers or a digital video disc for rental agents.

Furthermore, the method for decoding picture signal and the picture signal decoding apparatus can be utilized to a reproducing apparatus for reproducing a disc or a tape on which the compressed video signal is recorded. Moreover, the method for decoding picture signal and the picture signal decoding apparatus can be utilized to a receiving apparatus for reproducing a transmitted compressed video signal in systems such as CATV, satellite broadcast, television conference, television telephone, video on demand.

I claim:

1. A method for encoding picture signal, comprising the steps of:

non-linearly quantizing at least a part of a signal band of a specified picture signal in accordance with a non-linear characteristic to generate a first quantization coefficient;

converting said first quantization coefficient in specified block units to generate a conversion coefficient;

quantizing said conversion coefficient to generate a second quantization coefficient; and variable-length encoding said second quantization coefficient.

2. The method for encoding picture signal according to claim 1, wherein the step of non-linearly quantizing non-linearly quantizes said specified picture signal in said block units.

3. The method for encoding picture signal according to claim 1, wherein the step of non-linearly quantizing includes the steps of:

dividing said specified picture signal into high-frequency signal and low-frequency signal;

non-linearly quantizing said high-frequency signal in accordance with said non-linear characteristic; and synthesizing said quantized high-frequency signal and said low-frequency signal.

4. The method for encoding picture signal according to claim 1, wherein the step of non-linearly quantizing includes the steps of:

dividing said specified picture signal into high-frequency signal and low-frequency signal;

adaptively selecting said non-linear characteristic from a plurality of non-linear characteristics to provide a selected non-linear characteristic;

non-linearly quantizing said high-frequency signal in accordance with said selected non-linear characteristic; and synthesizing said quantized high-frequency signal and said low-frequency signal.

5. The method for encoding picture signal according to claim 4, wherein said non-linear characteristic is adaptively selected in said block units and wherein the step of variable length encoding encodes said selected non-linear characteristic.

6. The method for encoding picture signal according to claim 1, wherein the step of non-linearly quantizing includes the steps of:

dividing said specified picture signal into a plurality of frequency components;

non-linearly quantizing said plurality of frequency components in accordance with a plurality of non-linear characteristics in which the high frequency components are emphasized; and synthesizing said plurality of frequency components quantized.

7. The method for encoding picture signal according to claim 1, further comprising the step of generating said specified picture signal by calculating the difference between an input picture signal and a predicted picture.

8. A method for decoding an encoded picture signal, comprising the steps of:

variable-length decoding a received encoded picture signal to generate a variable-length decoded signal;

inversely quantizing said variable-length decoded signal to generate a first inverse quantized signal;

inversely converting said first inverse quantized signal in specified block units to generate an inverse conversion signal; and non-linear inverse quantizing said inverse conversion signal in accordance with a non-linear characteristic to generate a second inverse quantized signal.

9. The method for decoding picture signal according to claim 8, wherein the step of non-linear inverse quantizing inversely quantizes said inverse conversion signal in said block units.

10. The method for decoding picture signal according to claim 8, wherein the step of non-linear inverse quantizing includes the steps of:

dividing said inverse conversion signal into high-frequency signal and low-frequency signal;

non-linear inverse quantizing said high-frequency signal in accordance with said non-linear characteristic; and synthesizing said inversely quantized high-frequency signal and said low-frequency signal.

11. The method for decoding picture signal according to claim 8, wherein the step of non-linear inverse quantizing includes the steps of:

dividing said inverse conversion signal into high-frequency signal and low-frequency signal;

adaptively selecting said non-linear characteristic from a plurality of non-linear characteristics to provide a selected non-linear characteristic;

non-linear inverse quantizing said high-frequency signal in accordance with said selected non-linear characteristic; and synthesizing said inversely quantized high-frequency signal and said low-frequency signal.

12. The method for decoding picture signal according to claim 11, further comprising the step of decoding discrimination information for selecting said non-linear characteristic from a plurality of non-linear characteristics which corresponds to a non-linear characteristic selected for encoding said picture signal; and the step of adaptively selecting adaptively selects said non-linear characteristic in said block units as a function of said discrimination information.

13. The method for decoding picture signal according to claim 8, wherein the step of non-linear inverse quantizing includes the steps of:

dividing said inverse conversion signal into a plurality of frequency components;

non-linear inverse quantizing said plurality of frequency components in accordance with a plurality of non-linear characteristics in which the high frequency components are suppressed; and synthesizing said plurality of inversely quantized frequency components.

14. The method for decoding picture signal according to claim 8, further comprising the step of adding said second inverse quantized signal to a predicted picture generate a decoded picture.

15. A picture signal encoding apparatus, comprising:

non-linear quantization means for non-linearly quantizing at least a part of a signal band of a specified picture signal in accordance with a non-linear characteristic to generate a first quantization coefficient;

conversion means for converting said first quantization coefficient in specified block units to generate a conversion coefficient;

quantization means for quantizing said conversion coefficient to generate a second quantization coefficient; and variable-length encoding means for variable-length encoding said second quantization coefficient.

16. The picture signal encoding apparatus according to claim 15, wherein said non-linear quantization means non-linearly quantizes said specified picture signal in said block units.

17. The picture signal encoding apparatus according to claim 15, wherein said non-linear quantization means includes:

means for dividing said specified picture signal into high-frequency signal and low-frequency signal;

means for non-linearly quantizing said high-frequency signal in accordance with said non-linear characteristic; and means for synthesizing said quantized high-frequency signal and said low-frequency signal.

18. The picture signal encoding apparatus according to claim 15, wherein said non-linear quantization means includes:

means for dividing said specified picture signal into high-frequency signal and low-frequency signal;

means for adaptively selecting said non-linear characteristic from a plurality of non-linear characteristics to provide a selected non-linear characteristic;

means for non-linearly quantizing said high-frequency signal in accordance with said selected non-linear characteristic; and means for synthesizing said quantized high-frequency signal and said low-frequency signal.

19. The picture signal encoding apparatus according to claim 18, wherein said non-linear characteristic is selected in said block units; and said variable-length encoding means encodes said selected non-linear characteristic.

20. The picture signal encoding apparatus according to claim 15, wherein said non-linear quantization means includes:

means for dividing said specified picture signal into a plurality of frequency components;

means for non-linearly quantizing said plurality of frequency components in accordance with a plurality of non-linear characteristics in which the high frequency components are emphasized; and means for synthesizing said plurality of frequency components quantized.

21. The picture signal encoding apparatus according to claim 15, further comprising means for generating said specified picture signal by calculating the difference between an input picture signal and a predicted picture.

22. A picture signal decoding apparatus, comprising:

variable-length decoding means for variable-length decoding a received encoded picture signal to generate a variable-length decoded signal;

inverse quantization means for inversely quantizing said variable-length decoded signal to generate a first inverse quantized signal;

inverse conversion means for inversely converting said first inverse quantized signal in specified block units to to generate an inversely converted signal; and non-linear inverse quantization means for non-linear inverse quantizing said inversely converted signal in accordance with a non-linear characteristic to generate a second inverse quantized signal.

23. The picture signal decoding apparatus according to claim 22, wherein said non-linear inverse guantization means inversely quantizes said inversely converted signal in said block units.

24. The picture signal decoding apparatus according to claim 22, wherein said non-linear inverse quantization means includes:

means for dividing said inversely converted signal into high-frequency signal and low-frequency signal;

non-linear inverse quantization means for inversely quantizing said high-frequency signal in accordance with said non-linear characteristic; and means for synthesizing said high-frequency signal inversely quantized and said low-frequency signal.

25. The picture signal decoding apparatus according to claim 22, wherein said non-linear inverse quantization means includes:

means for dividing said inversely converted signal into high-frequency signal and low-frequency signal;

means for adaptively selecting said non-linear characteristics from a plurality of non-linear characteristics to provide a selected non-linear characteristics;

non-linear inverse means for inversely quantizing said high-frequency signal in accordance with said selected non-linear characteristic; and means for synthesizing said inversely quantized high-frequency signal and said low-frequency signal.

26. The picture signal decoding apparatus according to claim 25, wherein said variable-length decoding means decodes discrimination information for selecting said non-linear characteristic from a plurality of non-linear characteristics which corresponds to a non-linear characteristic selected for encoding said picture signal; and wherein said inverse non-linear quantization means adaptively selects said non-linear characteristic in said block units as a function said discrimination information.

27. The picture signal decoding apparatus according to claim 22, wherein said non-linear inverse quantization means includes:

means for dividing said inversely converted signal into a plurality of frequency components;

non-linear inverse quantization means for inversely quantizing said plurality of frequency components in accordance with a plurality of non-linear characteristics in which the high frequency components are suppressed; and means for synthesizing said plurality of inversely quantized frequency components.

28. The picture signal decoding apparatus according to claim 22, further comprising means for adding said second inverse quantized signal to a predicted picture.

* * * * *